United States Patent [19]

Lines

[11] Patent Number: 4,720,318

[45] Date of Patent: Jan. 19, 1988

[54] METHOD AND APPARATUS FOR MAKING WOODEN I-BEAMS

[75] Inventor: Jerry L. Lines, Wilmington, N.C.

[73] Assignee: Gang-Nail Systems, Inc., Miami, Fla.

[21] Appl. No.: 843,228

[22] Filed: Mar. 24, 1986

Related U.S. Application Data

[63] Continuation-in-part of Ser. No. 764,180, Aug. 9, 1985.

[51] Int. Cl.[4] .................. B27D 1/10; B32B 31/18
[52] U.S. Cl. ..................... 156/258; 156/259; 156/260; 156/264; 156/353; 156/510; 156/516; 156/517; 144/3 M; 144/136 R; 52/729
[58] Field of Search .............. 156/257, 258, 259, 260, 156/264, 273.5, 275.7, 275.5, 304.5, 353, 510, 516, 517; 144/3 M, 13 GR, 169, 344, 345, 346, 347, 348, 360, 368, 371, 376; 52/729, 731

[56] References Cited

U.S. PATENT DOCUMENTS

| | | | |
|---|---|---|---|
| 3,477,485 | 11/1969 | Talbott | 156/268 |
| 3,894,908 | 7/1975 | Troutner et al. | 52/729 |
| 4,074,498 | 2/1978 | Keller et al. | 52/729 |
| 4,191,000 | 3/1980 | Henderson | 52/729 |
| 4,195,462 | 4/1980 | Keller et al. | 52/729 |
| 4,356,045 | 10/1982 | Elford et al. | 156/275.5 |
| 4,413,459 | 11/1983 | Lambuth | 52/729 |
| 4,456,497 | 6/1984 | Eberle | 52/729 |
| 4,458,465 | 7/1984 | Coe | 52/729 |

*Primary Examiner*—Caleb Weston

*Attorney, Agent, or Firm*—Lowe, Price, Leblanc Becker & Shur

[57] ABSTRACT

A complete production line of a wood I-beam manufacturing apparatus and the method of manufacture is disclosed wherein generally identical chord members are simultaneously formed by cutting of a wooden stock material into the chord members and simultaneously providing grooves in one surface of each chord into which web members are received to form the I-beam. The individual web members are conveyed along a chords and webs assembly line between the grooved chords and the chords are converged so that the grooves interfit with the web edges to form the I-beam. The web longitudinal edges are preferably beveled in an off-line beveling operation. The beveled webs are stacked for feeding into the chords and webs assembly line. Prior thereto, first and second glue layers are applied to one transverse edge of each stacked web member. The web members are subsequently conveyed in the assembly line in end-to-end abutting relationship. The chords are independently driven at a speed greater than the webs so that the in-line chords abut each other in end-to-end relationship to minimize waste of material. Prior to abutting each other, a trailing end of one of the chords is sensed to actuate a flying cut-off saw positioned at the end of the production line by a distance equal to the desired length of the cut beam. After cutting, the cut beams are conveyed off the line for inspection and packaging.

57 Claims, 19 Drawing Figures

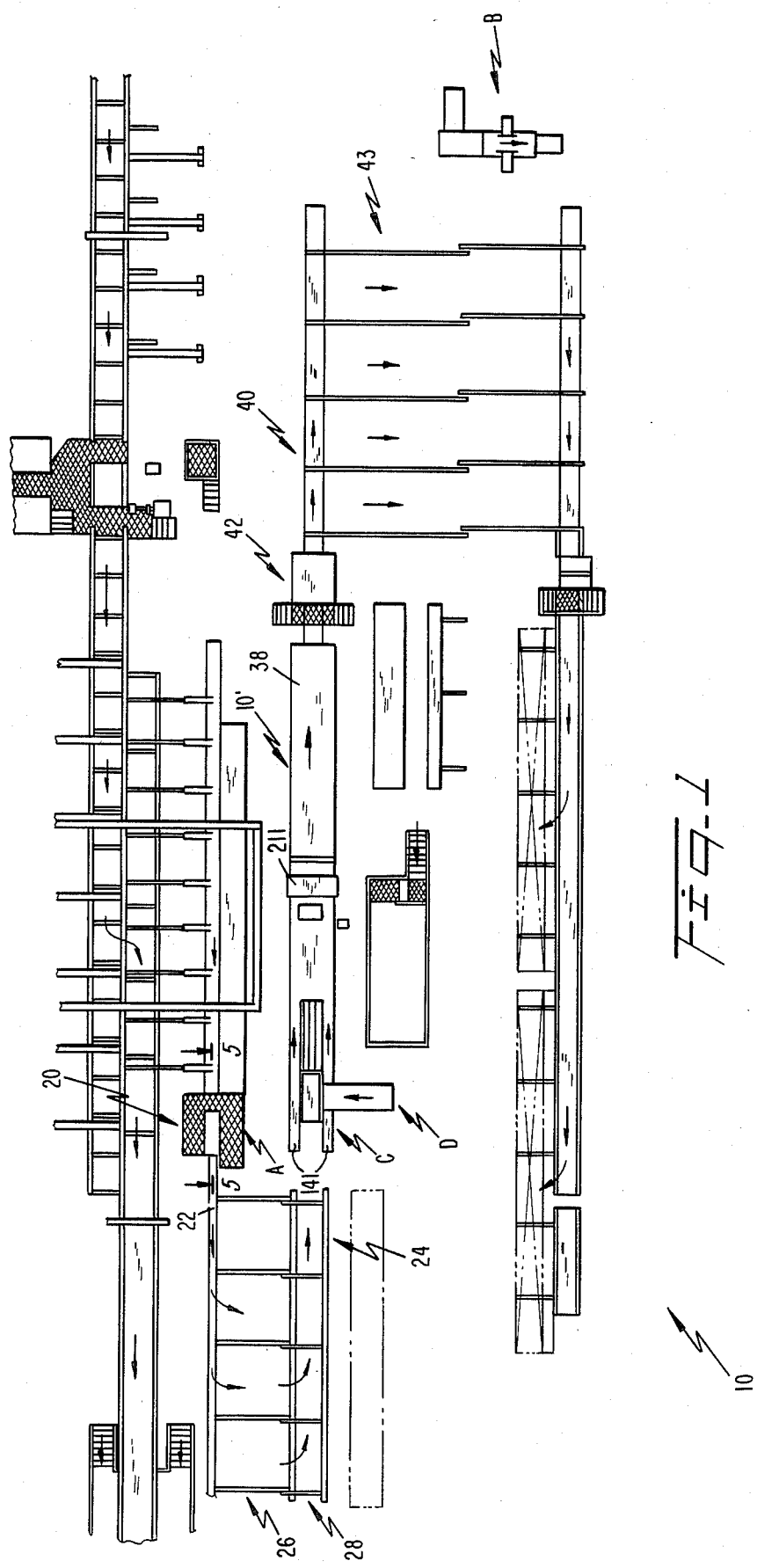

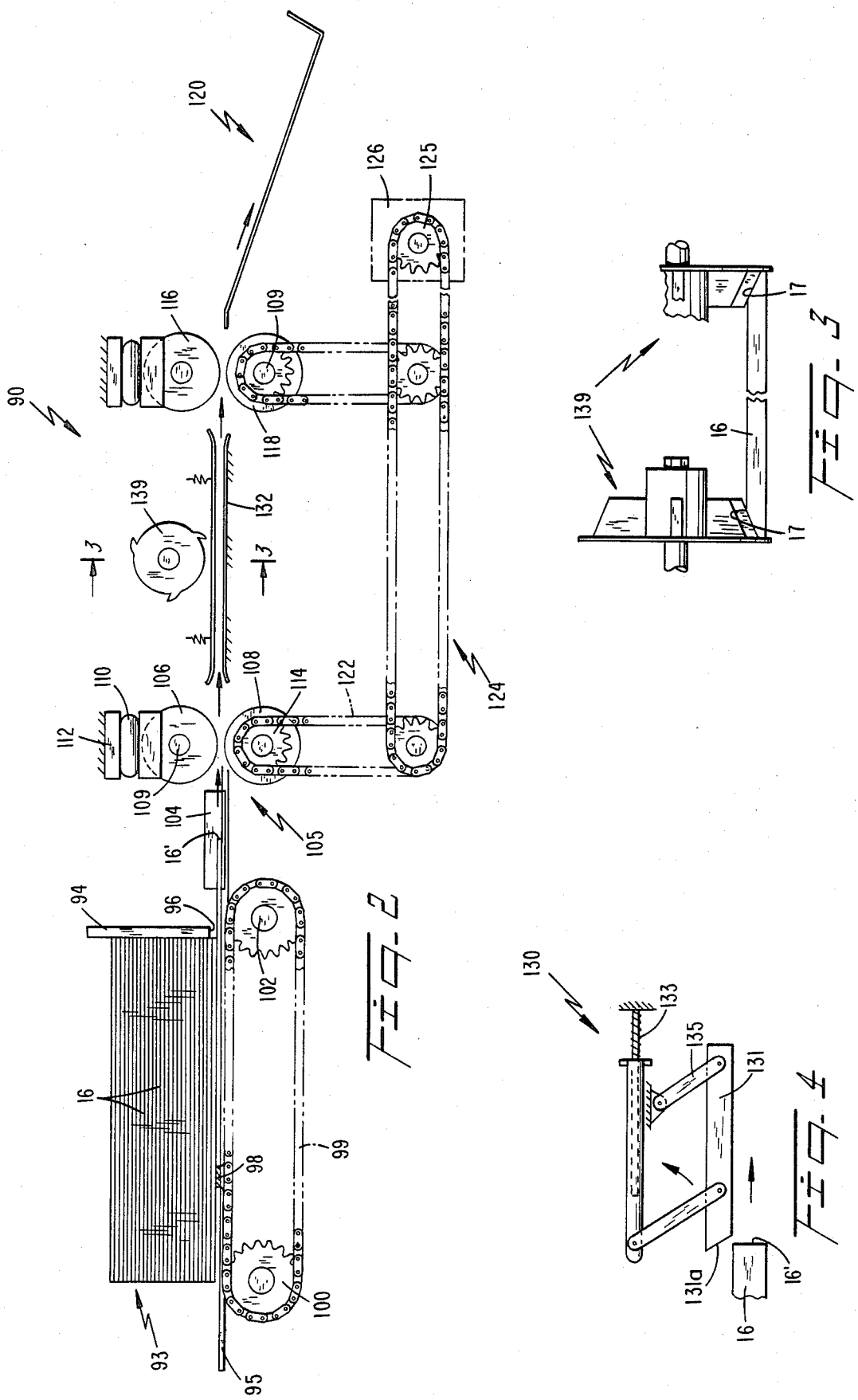

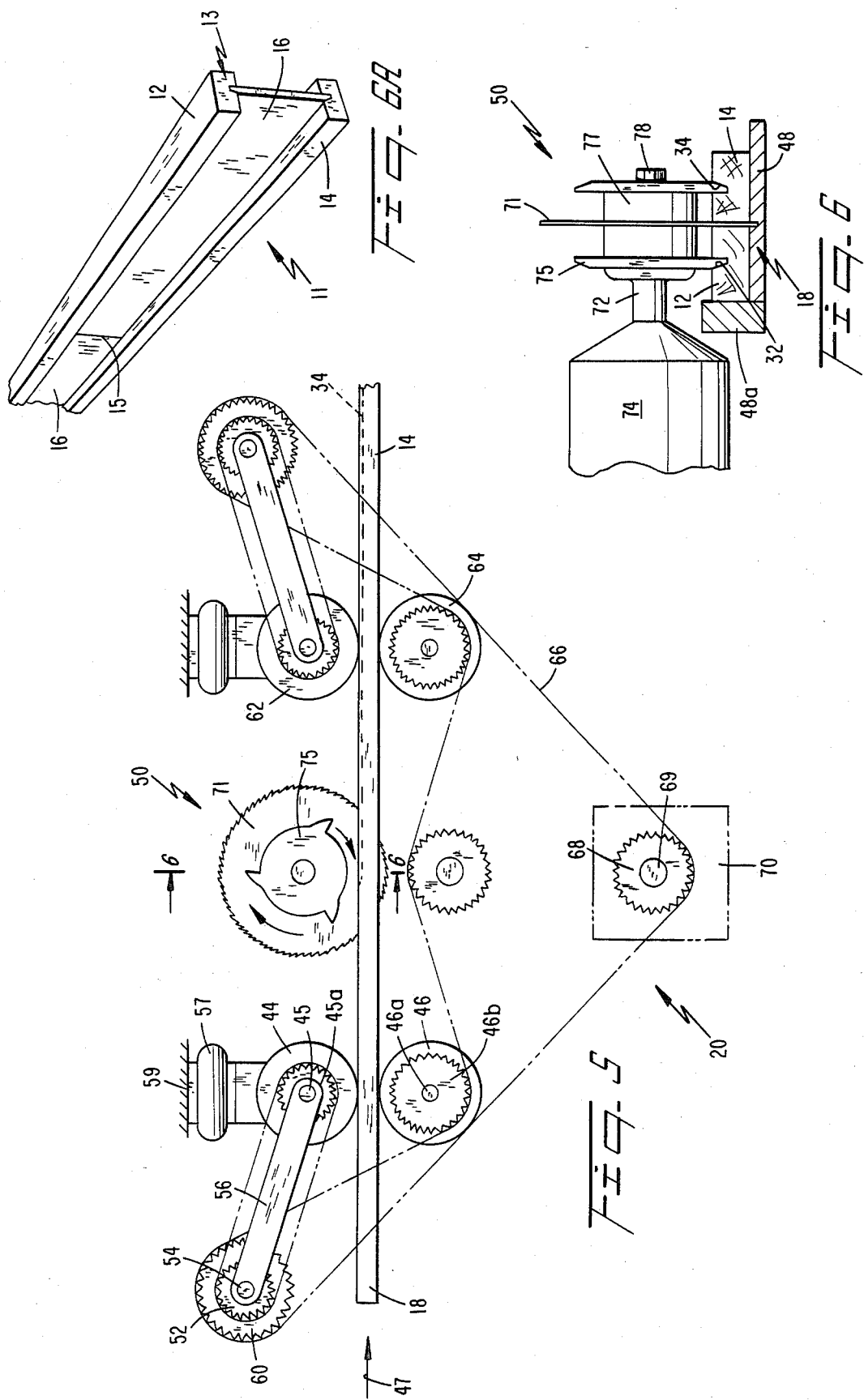

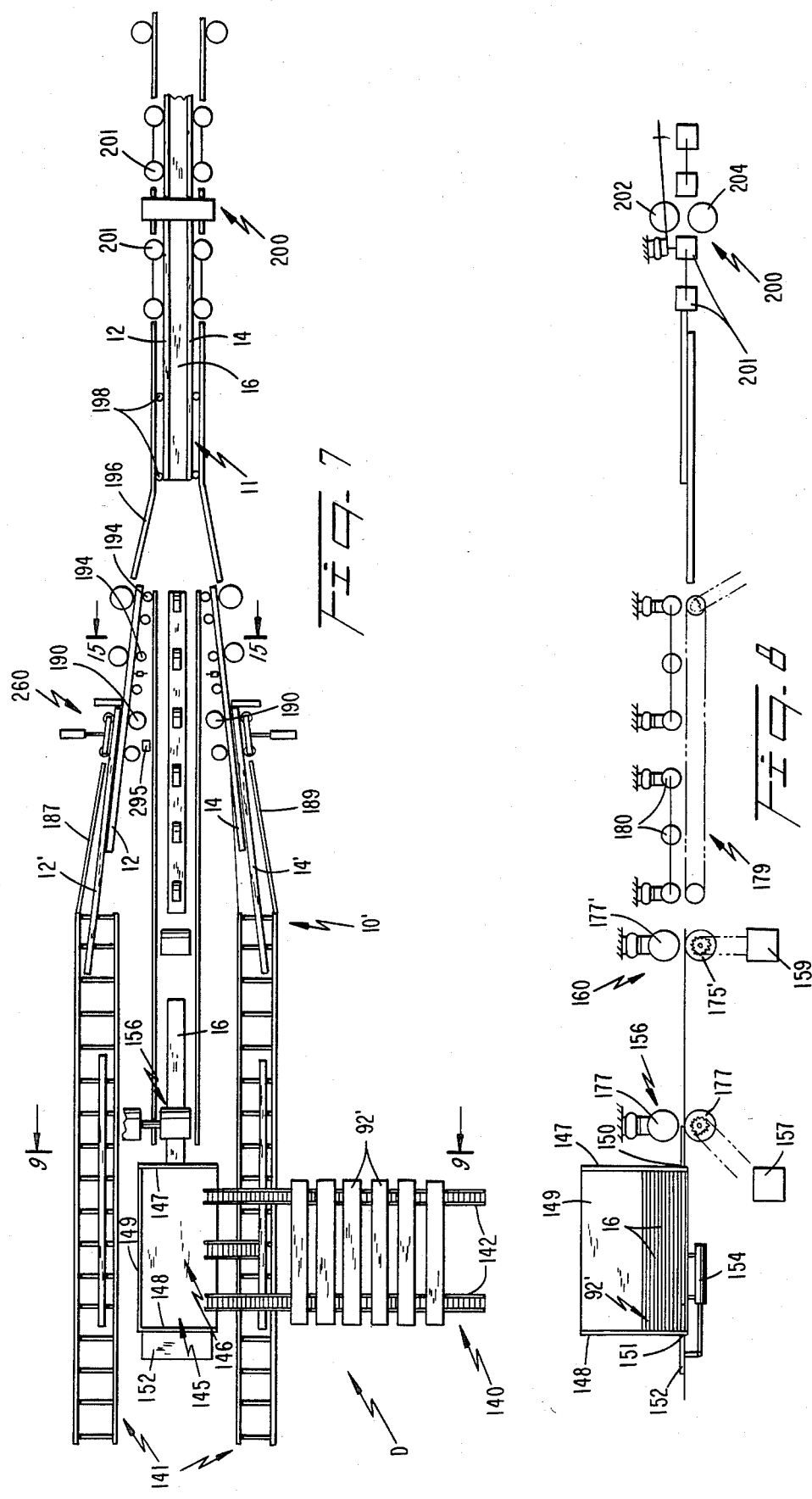

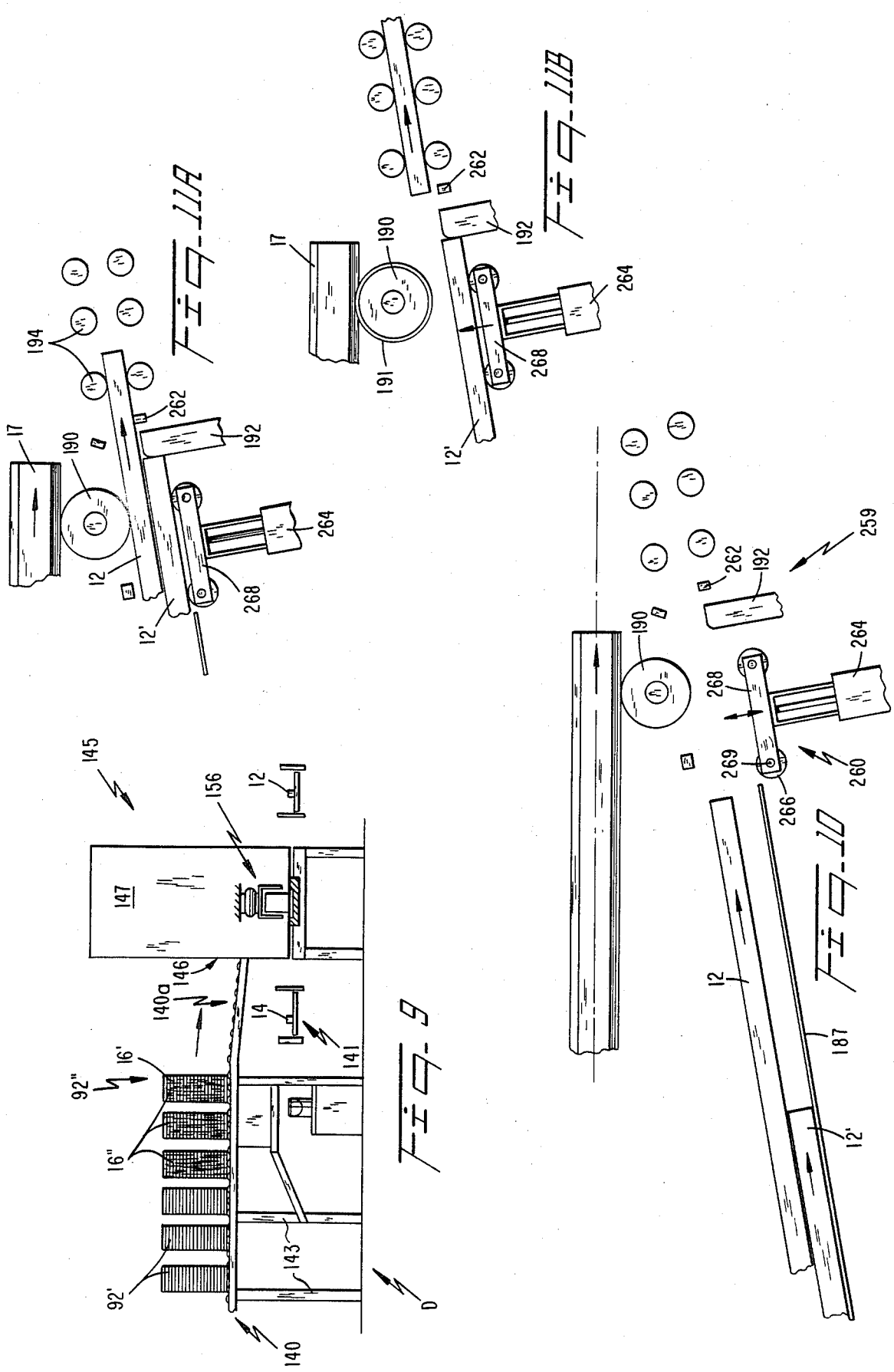

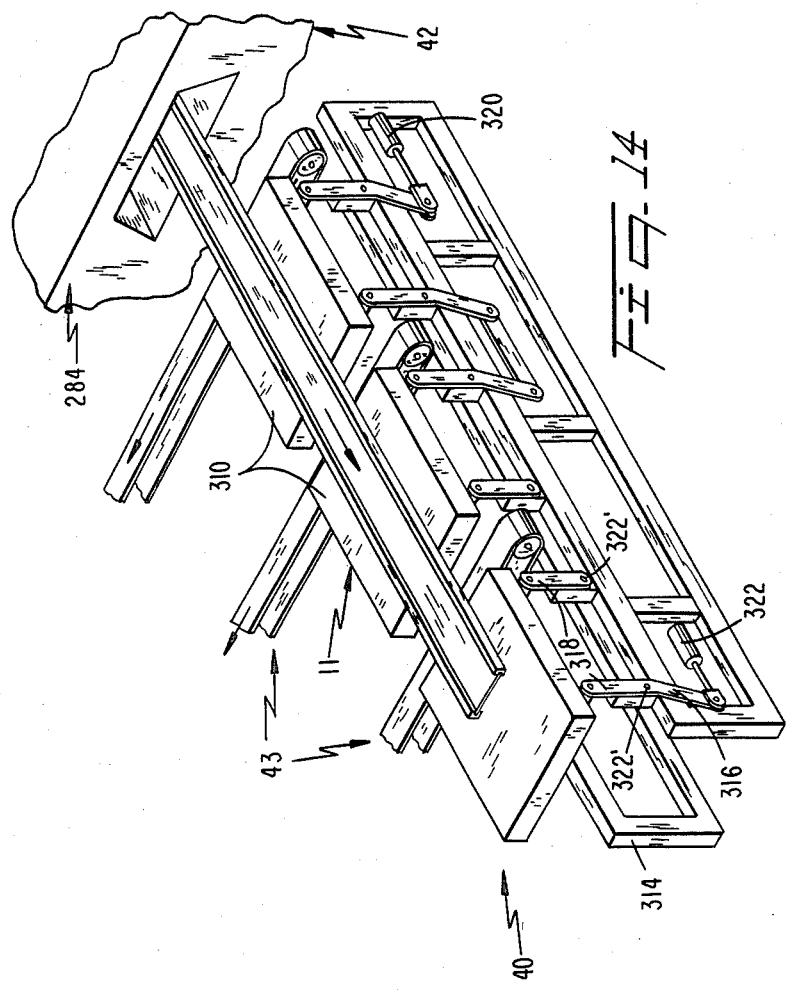
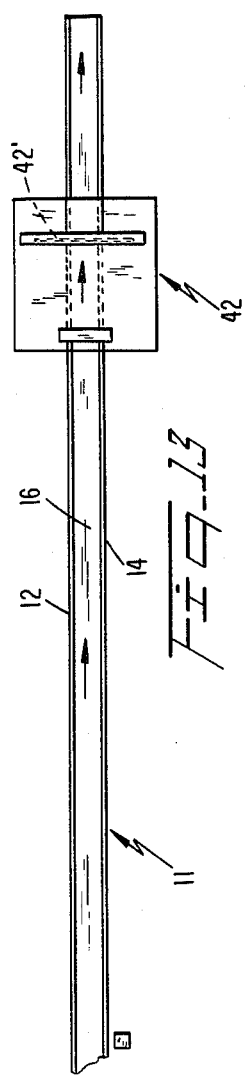
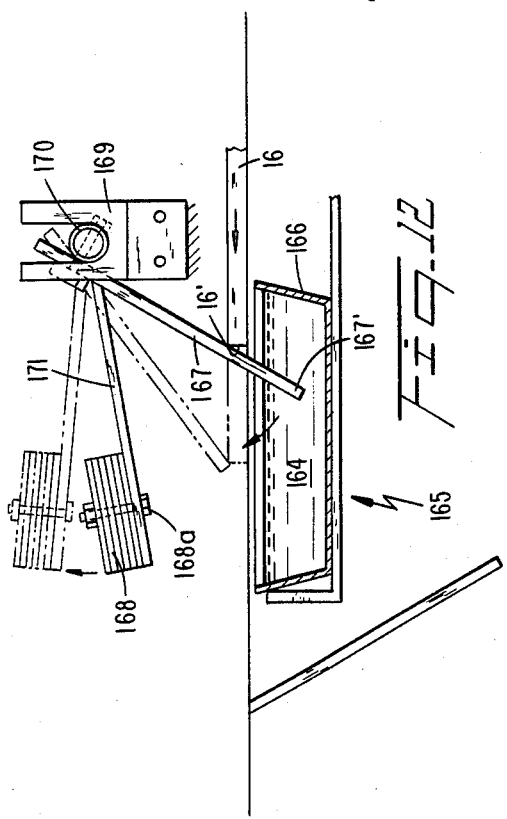

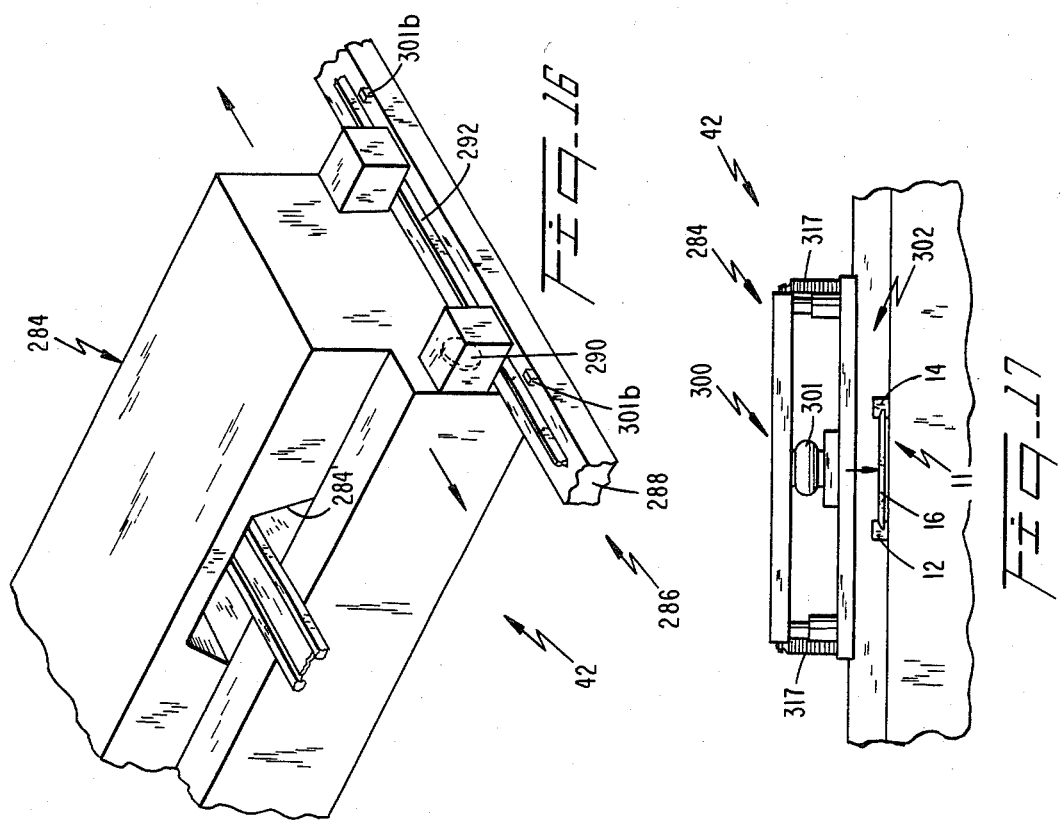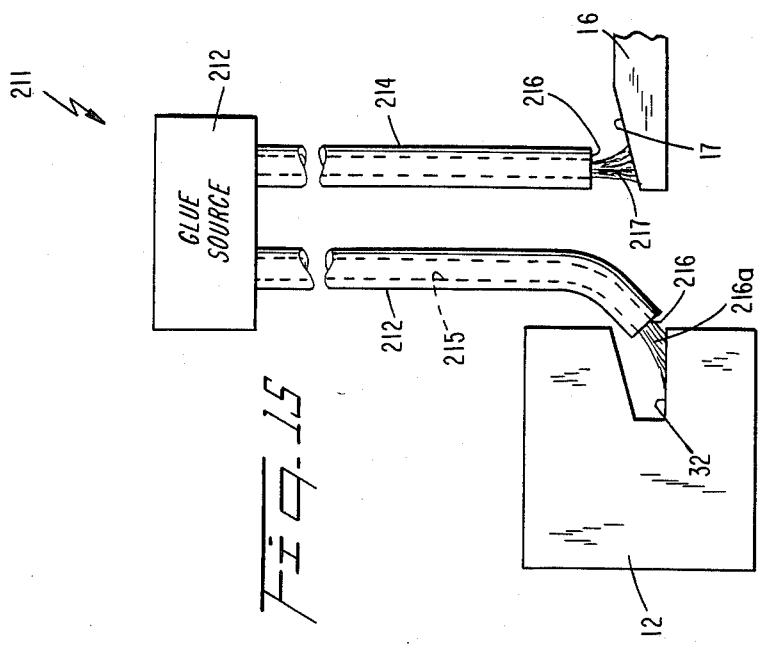

METHOD AND APPARATUS FOR MAKING WOODEN I-BEAMS

RELATED APPLICATIONS

The present application is a continuation-in-part of my co-pending U.S. patent application Ser. No. 764,180, filed Aug. 9, 1985.

BACKGROUND OF THE INVENTION

This invention relates to an improved method and assembly apparatus for making a wooden beam fabricated from a pair of wood chord members and a web member interconnecting such chord members by means of glued or unglued joints.

The rising costs of sawn lumber in general and the scarcity of high quality wood capable of producing beams of large size have led to the development of processes for fabricating large beams from less expensive and more available wood products. The use of fabricated beams also permits more efficient design requiring less wood to provide a beam of given strength. This not only saves wood but also reduces the cost of transportation and facilitates the erection of wooden structures.

Where strength is required to support loads applied primarily in one direction, considerable saving of weight and material costs may be accomplished by using a fabricated wooden I-beam. This general design provides the required strength and support of compressive strength loads generated by application of a load to the top of the I-beam resting on supporting structure, as when such a beam is used as a rafter or joist.

When a downward load is applied to the top of an I-beam which has its ends supported from below and its "I" cross-section in an upright orientation, the stresses which are generated are generally distributed as compression along the top chord or flange portion of the I-beam and tension in the bottom chord or flange portion. The width of the top and bottom chords or flanges provides the required lateral stiffness allowing the use of a narrow vertical web connecting the flanges. Thus, for a given load supporting capacity in this type of environment, an I-beam is lighter than a solid beam having a rectangular cross-section.

This invention relates to methods and apparatus for making wooden I-beam structures wherein both the chord or flange members and the webs may either be solid wood members or composite or laminated wood members as desired. Beams of this general type have been disclosed extensively in the prior art as illustrated, by way of example, in U.S. Pat. Nos. 3,490,188, 4,074,498, 4,191,000, 4,195,462, 4,249,355, 4,336,678, 4,413,459, 4,456,497 and 4,458,465, the foregoing listing being intended as exemplary only and not as all inclusive.

Prior known procedures and arrangements for forming prefabricated wooden I-beams by gluing various members together have generally entailed the use of various sub-assemblies in which a series of webs are driven along a web conveyor line in either spaced or end-to-end abutting relationship, with a pair of grooved chords or flanges driven along opposite sides of the web conveyor. The flanges are driven with their grooves facing the webs and are gradually converged towards the conveyed webs so that the longitudinal web edges, often pre-glued, are forced to respectively enter the grooves to form an interconnecting glued joint therewith. Heat or radio frequency energy may be used to set the glue more quickly and the formed wooden I-beams emerging from the assembly line may then be cut, if necessary, to form a wooden I-beam of desired length.

Other sub-assemblies and mechanical procedures are employed to cut the chords or flange members to desired lengths and widths usually delivered to the I-beam production facility where a groove cutter is employed to cut a longitudinal groove along the length of the chord in one side thereof. Typically, however, wooden stock material of either random or constant lengths are delivered to the production facility where the material is split or cut substantially along the longitudinal axis to form a pair of chord members. These chord members are then conveyed to a separate sub-assembly containing a groove cutter for cutting the grooves as aforesaid. Other sub-assemblies are employed to cut the web members to desired length and width and thereafter to provide parallel beveled or shaped edges along longitudinal sides of the web members, such edges being generally complementary with the cross-sectional groove shapes.

In one prior art arrangement disclosed in Elford et al, U.S. Pat. No. 4,356,045, acquired by the assignee of the present application flanges or chord members pre-cut to desired width are joined together from random lengths to obtain corresponding top and bottom chords of desired length. Upon being cut, numerous sub-assemblies are then employed to groove the separate flange or chord members. These sub-assemblies include a chord transfer mechanism and production floor space therefor, a groove cutter staging area, a groove cutter conveyor, a groove cutter mechanism and an automatic repositioning mechanism for cutting a groove surface in the chord member one at a time.

The foregoing acts of cutting identical chords or flanges from wooden stock material of either random or standard length engenders the use of considerable handling of wooden material and corresponding machinery first to actually cut the material and then to actually deliver same to other machinery for groove cutting.

Separate equipment and operations are provided for longitudinal beveled or other shaped edges in the web members employed in prior known procedures and arrangements. In the above-identified Elford et al patent, for example, motor driven bevel forming heads are employed to create tapers on opposite longitudinal edges of the webs by introducing individual plywood web pieces, pre-cut to approximate width onto a web support drive roll which conveys the individual pieces past the straight cutting heads. The cutting heads are employed directly within the production line upstream from where the webs are successively conveyed into abutment with one another to form a continuous web material. In the event the bevel forming heads and associated drive and conveyor machinery require repair, a particular production run must be stopped until such repair is effected. In other words, there is no provision for stock-piling pre-cut, individual beveled web members for later use in a particular production run so that such production run is not dependent upon the act of beveling the individual web pieces during the actual run.

In the commercial practice of the Elford et al patent, a glue layer is applied to a leading transverse end of each web member as it is initially fed into the production line upstream from the bevel forming heads. As the pre-glued web members enter into contact with the bevel forming heads, glue from the leading end tends to drip down and enter between the bottom of the web member and an underlying bed plate or support on which the webs move past the bevel forming heads. This glue tends to form a film along which the bottom of the web members ride causing mis-alignment with the bevel forming heads which later result in an inferior joint with the interconnecting chords and the grooves therein.

Glue coated onto the leading transverse edge of each web prior to beveling is also to some extent absorbed into the porous wooden material forming the web. This occasionally results in inferior bonds between the webs when later moved into end-to-end relatiohship to form a continuous web, compromising the structural integrity of the formed wooden I-beam.

After the webs are joined to the length of each of a pair of chords forming the wooden I-beam, the beam is conveyed towards a cutting saw which is connected to a spring mounted feeler bar upstream from the saw that rides along one of the chords to sense the trailing end thereof. This trailing end is identified by driving preceding and succeeding respective top and bottom chords into joining contact with the web members to form a gap between the adjacent chords which is typically four to eight inches in length. The spring mounted feeler bar thus senses the trailing end by entering the gap. The web cutting saw is then pulled towards the gap to cut the web at the gap while moving at the same production line speed thereof. This gap must be trimmed from each adjoining free end of adjacent cut wooden I-beams resulting in wasted material and the requirement of trimming at least one end of each cut wooden I-beam following the cutting cycle.

According to other prior designs disclosed, for example, in Talbott, U.S. Pat. No. 3,477,485, Troutner, U.S. Pat. No. 3,616,091, Troutner et al, U.S. Pat. No. 3,894,908, individual flange groove cutters and web beveling heads are mounted directly within the associated production line. This means that additional machinery and handling was previously required to cut wooden stock material into substantially identical flange or chord members which are then fed into the production line for joining two webs.

Other arrangements and types of production line and related methods and apparatus for forming wooden I-beams have been proposed in the prior art, and it is to be understood that the foregoing discussion is intended as illustrative and not as all inclusive. While certain of these prior known arrangements and systems may provide one or more advantages, they also present problems and disadvantages.

SUMMARY OF THE INVENTION

It is a primary object of the present invention to provide a method and related apparatus for fabricating a wooden I-beam which overcomes or at least minimizes the disadvantages encountered with prior methods and apparatus for making same.

One of the principal objects of the present invention is to provide a method and related apparatus for simultaneously cutting or splitting wooden stock material of predetermined length into substantially identical chord or flange members while also more or less simultaneously cutting longitudinal grooves of predetermined cross-section into one surface of each resulting chord or flange as the wooden stock material is cut into the separate chord members.

Another object of the invention is to more or less simultaneously cut the wooden stock material into a pair of grooved chord members off the production line where the chord members are to be joined to web members in order to simplify the production or assembly line and maximize the use of existing production floor space.

It is another object of the present invention to provide the longitudinal edges of the web members to be joined to the chords with scarfed or beveled longitudinal edges before these web members are transported and supplied to a production line where they will be joined to top and bottom chords forming a wooden I-beam.

It is another object of the present invention to provide at least one transverse edge of each web member with at least one layer of glue after the beveling operation occurs and only when the web members are to be joined in an end-to-end relationship to form a continuous web material joined to the chord members.

It is another object of the invention to provide at least one of the transverse web edges with a first layer of glue which is absorbed to some extent by the somewhat porous wooden web material and then a second layer of glue to promote excellent bonding between the web members when they are joined in end-to-end relationship.

It is still another object of the invention to provide a wooden I-beam which is formed by driving preceding and succeeding flange or chord members into abutting or end-to-end contact with each other prior to being connected to the web members to minimize waste material and lower production costs.

Yet another object is to provide a wooden I-beam cut to standard lengths by sensing the trailing end of one of the flange members forming the I-beam before the succeeding flange is driven into abutting contact with the trailing end of the preceding flange so that the sensed trailing end of the preceding flange may be used to actuate a downstream cutting saw.

Another object of the invention is to cut the I-beam into standard or non-standard lengths by sensing the leading end of the wooden I-beam after it passes downstream from the cutting saw and then actuating the cutting saw to cut the wooden I-beam upon sensing of said leading end.

According to the present invention, a method of making a unitary wooden I-beam from a pair of elongated wooden chord members and planar wooden web members comprises the steps of forming a pair of elongated flange or chord members by cutting a rectangular elongated piece of lumber substantially along its longitudinal axis into said chords and more or less simultaneously cutting longitudinal grooves into one surface of each chord substantially parallel to the longitudinal axis thereof. Opposite longitudinal edges of the web members are shaped to provide beveled edges and the web members are then grouped and conveyed along a chords and webs assembly line while a pair of chords are driven respectively along opposite sides of the web members with chord drive members and with the longitudinal grooves of the chords facing the web members. The chords are directed towards the web members so that opposite edges of the web members are respectively inserted into the longitudinal grooves of the pair of chords to form an interconnecting joint therebetween and thereby the wooden I-beam. The I-beam may then be cut to desired length after the chords and web members are joined together.

Preferably, the wooden stock material is cut and grooved both simultaneously and off the chords and webs assembly line. A pair of chords may then be directed from the cutting and grooving location for placement along opposite sides of the web members in the chords and webs assembly line.

It is also a preferred feature of the method of the invention to provide the beveled edges on each web member simultaneously by directing the web member into contact with a pair of cutting members positioned off the chords and webs assembly line. This essentially allows the beveled web members to be grouped in stacks and fed to the chords and webs assembly line as needed.

Prior to feeding the beveled web members to the assembly line, it is preferred to coat a leading transverse edge of each web member positioned in stacks adjacent the assembly line with a layer of glue when the web members are to be driven into end-to-end relationship forming a continuous web material joined to the chords. In accordance with the invention, a second layer of glue is applied to each pre-glued leading transverse web edge in a next-in-line stack to be fed into the assembly line. Since the first layer of glue tends to be absorbed by the wooden web member, the application of a second glue layer promotes excellent bonding between end-to-end web members to improve the structural integrity of the wooden I-beam.

It is advantageous to practice the method according to the present invention by simultaneously cutting and grooving wooden stock material to form a pair of elongated chord members and beveling the web members off the chords and webs assembly line and thereafter applying two layers of glue to the web leading transverse edges prior to feeding a stack of webs into the assembly line. However, the step of cutting and grooving the wooden stock material simultaneously or applying two layers of glue to the web leading transverse edges after beveling the webs may be practiced independently of one another in order to still realize advantages of the method of the present invention.

According to yet another feature of the method of the present invention it is preferred to provide independent drives for the web feeding mechanism and flange feeding mechanism along the webs and chords assembly line. A separate beam drive mechanism is employed downstream from the chord drive mechanism and web drive mechanism to drive the completed wooden I-beam through the assembly line. The chord drive mechanism preferably moves the individual chord members along the assembly line at a faster speed than the beam drive mechanism so that preceding and succeeding chords forming either top or bottom chord members in the completed wooden I-beam are driven into abutting contact with each other to minimize waste material and minimize the need for later trimming operations.

Prior to driving the preceding and succeeding chords into end-to-end abutting contact with each other, it is another feature of the present invention to sense the trailing end of a preceding chord before it is abutted by the leading end of the succeeding chord and also before the preceding chord trailing end is driven into interconnecting relationship with the web members. Sensing of the trailing end as aforesaid triggers a beam cutting saw positioned at a downstream location to cut the wooden I-beam into a standard length equal to the chord length.

The cutting saw is preferably movably mounted with respect to the longitudinal axis of the beam conveyor path and is clamped to the wooden I-beam upon detection of the trailing end to thereby move at the same speed as the I-beam to cut the beam to desired length before returning to its original position.

To cut wooden I-beaxs to standard and non-standard length, it is also within the scope of the present invention to sense the leading end of the wooden I-beam as it passes a downstream location spaced from the cutting saw by a distance equal to the desired length of the beam and immediately thereafter clamping the saw to the beam to effect the desired cut length.

According to another aspect of the method of the invention, it is preferred to position the next-in-line or succeeding chord members with their leading ends in imposing relation to the chord drive mechanism as the preceding chords are moved into adjoining contact with the web members. The next-in-line or succeeding chord members are therefore positioned immediately outside the chord feed path of the chords and webs assembly line and, upon sensing of the trailing end of the in-line or preceding chords as these trailing ends clear the chord drive mechanism, the leading ends of the succeeding chords are pushed into the feed path into driving contact with the chord drive mechanism where these leading ends are accelerated into abutting contact with the trailing ends of the preceding chords prior to connection to the web members.

Prior to inserting the web member beveled edges into the chord grooves, it is preferred to apply a glue bead to upwardly disposed beveled edges and to upwardly disposed surfaces of the chord grooves being conveyed along the webs and chords assembly line. The glued joints between the edges of the web member and the flange members provide a strong joint to secure the flange and web members into unitary relationship.

A webs and chords production line assembly for making a unitary wooden I-beam in accordance with the present invention comprises a web conveyor system and web drive members for conveying the web members therealong in in-line relationship to each other. A chord drive mechanism independent of the web drive mechanism conveys a pair of chords respectively along opposite sides of the web members with the longitudinal grooves of the chords facing the web members. The chord drive mechanism includes a pair of chord drive members positioned in opposing relation to each other. Converging guide members are provided for directing the pair of chords towards the web members so that opposite edges of the web members are respectively inserted into the longitudinal grooves of the pair of chords to form an interconnecting joint therebetween and thereby the wooden I-beam. The wooden I-beam is independently driven by a beam drive system at a predetermined continuous speed which is less than the speed at which the chords are driven. Thus, the next-in-line pair of chords are driven into contact with the preceding chords being joined to the web members to minimize waste material that must be cut from the wooden I-beam prior to use. Stop means is provided for positioning the leading ends of the next-in-line pair of chords in opposing relation to the chord drive wheels and chord rams are provided to push the next-in-line chords into driving contact with the chord drive wheels upon being actuated by sensors detecting passage of the trailing ends of the preceding chords downstream from the drive wheels.

The next-in-line chord positioning means preferably includes a pair of stop bars positioned adjacent the in-line chord feed path and out of that path slightly downstream from the chord drive wheels. The next-in-line chords and the leading ends thereof are positioned against the stop bars so that the next-in-line chord leading ends are in opposing relation to chord drive wheels.

The production line assembly of the present invention also includes a sensor, such as a photocell, positioned above the feed path of one of the in-line chords to sense the presence of the trailing end thereof at the sensing location. The sensor then triggers the cutting saw which is movably mounted on a carriage downstream from the sensor by a distance equal to the chord length and clamping members on the carriage clamp against the moving wooden I-beam to drag the carriage and thereby the saw at the same speed as the wooden I-beam at which time the saw translates to precisely cut the beam to desired standard length. In the alternative, a sensor may be provided downstream from the saw to sense the leading end of the wooden I-beam to cut it to non-standard or standard lengths.

Further according to the present invention, there is apparatus for manufacturing a pair of elongated wooden chord members each including a longitudinal groove in one chord surface thereof, from an elongated rectangular wooden stock material. The apparatus comprises a splitter blade and a pair of dado blades or router tips respectively mounted on opposite sides of the blade. The splitter blade and dado blades are motor driven and positioned above a conveyor along which a length of stock material moves into cutting engagement with the splitter blade and router tips to simultaneously split the stock material into substantially identical chord members while forming the longitudinal grooves.

The splitter blade and router tips are preferably mounted on a common shaft extending transversely above the wooden stock material conveyor. The conveyor is defined by a bed plate and a side fence providing alignment with the blade and router tips. In-feed and out-feed drive rolls are used to feed the wooden stock material through the apparatus while providing hold-down support for maintaining the wooden stock material against the bed plate during cutting.

The router tips are preferably spaced from opposite sides of the splitter blade on the common shaft by spacer means. The common shaft may be an output shaft driven by an arbor motor. A separate motor is used to drive the in-feed and out-feed drive rolls through chain and sprocket driving arrangements.

BRIEF DESCRIPTION OF THE DRAWING

Additional objects and advantages of the present invention will be apparent from the following detailed description of the accompanying drawings wherein:

FIG. 1 is a diagrammatic floor plan view showing an illustrative assembly line arrangement for performing the principal steps of joining the flanges or chords to the web of a wooden I-beam in accordance with the present invention and floor plan locations wherein the web members are beveled and wooden stock material is simultaneously cut and grooved to form grooved chord members;

FIG. 2 is a partial schematic and side plan view of a scarfer machine for beveling opposite longitudinal edges of individual web members;

FIG. 3 is a sectional view taken along the line 3—3 of FIG. 2 showing details of the beveling heads provided in the scarfer machine;

FIG. 4 is a side view of a hold-down presser assembly employed in the scarfer machine to maintain the individual web members in a single plane during scarfing;

FIG. 5 is a partial cross-sectional and schematic view of an apparatus for simultaneously splitting and grooving wooden stock material into a pair of separate chord members;

FIG. 6 is a sectional view taken along the line 6—6 of FIG. 5 depicting the cutting mechanism of the splitting and grooving apparatus;

FIG. 6A is a perspective view of a wooden I-beam constructed in accordance with the method and apparatus of the present invention;

FIG. 7 is a top plan schematic view of a chords and webs assembly line employed in the present invention;

FIG. 8 is a side elevation view, partly schematic, of a web in-feed and web conveyor mechanism as well as a beam conveyor mechanism employed in the chords and webs assembly line;

FIG. 9 is a vertical elevation view, partly in section, of a lateral conveyor on which beveled web members are disposed in separate stacks for feeding into the web hopper of the chords and webs assembly line along line 9—9 of FIG. 7;

FIG. 10 is a top plan view, partly in section and partly schematic, of a positioning mechanism employed for positioning the leading end of a next-in-line chord in the chords and webs assembly line in opposing relation to chord drive wheels;

FIG. 11A is a view similar to FIG. 10 depicting the next-in-line chord leading end in a waiting position as the preceding chord is driven through the chords and webs assembly line by the chord drive wheels;

FIG. 11B is a view similar to FIG. 10 of the trailing end of the preceding chord clearing the chord drive wheels and the positioning and transfer mechanism moving the leading end of the next-in-line chord into the chord feed path for driving engagement with the chord drive wheels;

FIG. 12 is a vertical elevation view of an automatic applicator for applying glue to the leading transverse edges of individual web members;

FIG. 13 is a top plan view, partly schematic, of a flying cut-off saw used to cut the formed wooden I-beam into desired length;

FIG. 14 is a perspective view of various details of the flying saw positioned upstream from an out-feed table onto which the cut wooden I-beams are placed for transfer off the chords and webs assembly line;

FIG. 15 is a diagrammatic, partly sectional elevational view of glue applicator means for application of glue to certain surfaces of the web edges and chord grooves of a wooden I-beam made according to the present invention;

FIG. 16 is a partial perspective view of various details of the flying saw; and

FIG. 17 is a partial front elevational view of the flying saw in unclamped position with respect to the wooden I-beam.

DESCRIPTION OF THE PREFERRED EMBODIMENTS

Referring in detail to the figures of the drawing, there is shown diagrammatically in FIG. 1 a production area 10 including an assembly line 10' for making wooden I-beams having wood flanges or chords and wood web members. Specifically, the assembly line 10' performs various operations to secure flange or chord members 12 and 14 to a series of wood web members 16 to form web to chord joints generally indicated by 13. The web or wood member 16 is preferably formed of plywood or oriented strand board, called "OSB" (a form of flake board wherein strands of wood are oriented, overlapped and secured together by suitable glues to achieve strength properties superior to plywood) or the like. The web members may be of varying thicknesses such as ⅜, 7/16, ½, ⅝ inch and the like. The web member in the assembled wood I-beam constitutes a plurality of abutted sheets of such boards as illustrated in FIG. 6A. The sheets generally constitute rectangles which have a long dimension along a longitudinal axis which is substantially parallel to the longitudinal axes of the elongated chord or flange members 12 and 14. The web sheets form butt joints 15 with one another, and the web members preferably are secured together at such butt joints with adhesive or glue in the unique manner described below.

Each of the wood flange or chord members 12 and 14 has a generally rectangular cross-section perpendicular to its longitudinal axis as may be seen in FIG. 6. The flange members may be formed of commercially available wooden structural boards or may be formed of laminated veneer lumber (called "LVL") which is readily available in a large variety of lengths and thicknesses.

As will be seen more fully below, the flanges 12 and 14 are cut from rectangular stock material 18 and simultaneously provided with grooves 32 and 34 by means of a unique splitting-grooving machine 20 (FIGS. 5 and 6) provided off the assembly line 10' at a flange forming area A. After forming, the grooved flanges or chords 12 and 14 are discharged from machine 20 onto an out-feed table 22 for transfer to a flange feed location 24 via lateral conveyor ramp 26 and flange surge conveyor rack 28. Details of conveyor ramp 26 and surge rack 28 are set forth in U.S. Pat. No. 4,356,045 to Elford et al (e.g., FIGS. 20–22) incorporated herein by reference in its entirety. The chords 12 and 14 are respectively grouped on opposite sides of web in-feed location C with their grooves 32 and 34 facing each other, respectively.

The individual web members 16, pre-cut to desired length and width, undergo a beveling operation whereby their upper longitudinal edges are beveled or tapered as at 17 to respectively interfit with chord grooves 32 and 34 as discussed infra. The grooves 32,34 preferably have the same cross-section as the web beveled edges 17, depicted in FIG. 6A, or may have other cross-sections such as the type disclosed in my prior copending application identified above. Web beveling can occur off-line at beveling area B for transfer in stacks to web holding and gluing area D (adjacent web in-feed location C) where one transverse edge 16' of each web member 16 may be glued, in the unique manner below, to later form glued butt joints 15 in the continuous web.

The chords 12 and 14 are conveyed respectively along opposite sides of web members 16 which may be formed as a continuous web in assembly line 10'. The chords 12 and 14 are gradually converged towards web 16 so that beveled edges 17 enter grooves 32 and 34 to form a press-fitted interconnecting joint therebetween and thereby the wooden I-beam 11. The beveled edges 17 and grooves 32 and 34 are preferably glued prior to joining. The wooden I-beam then passes through radio frequency tunnel 38 which cures the glued groove of the I-beam 11. The I-beam 11 is discharged onto an out-feed table 40 provided with a beam cutting saw 42 which cuts the beam to desired length. Thereafter, the cut beams are transferred laterally from the out-feed table 40 by means of a cross-transfer conveyor 43 where the cut beams are ultimately trimmed, if necessary, and stacked for subsequent shipment.

Forming and Grooving the Flanges

Referring to FIGS. 5 and 6, splitting-grooving machine 20 comprises a pair of chain-driven, top and bottom in-feed drive rolls 44 and 46 extending transversely with respect to bed plates 48 for propelling rectangular stock material 18 towards a chord splitter and groover mechanism 50. The top in-feed roll 44 is mounted on a cross shaft 45 with a sprocket 45a keyed to the shaft. In-feed roll 44 is chain-driven through sprocket 45a by a drive sprocket 52 mounted on a cross shaft 54 rotatably journalled in machine side frame members (not shown). The shaft 45 supporting drive roll 44 is pivotally connected to opposite ends of cross shaft 54 with links 56 (only one shown) to allow the drive roll 44 pivotal movement about shaft 54 and relative to the stock material feed path 47 to accommodate stock material of varying height. Drive roll 44 with an air bag 57 mounted to overhead support 59 is resiliently downwardly biased towards bottom roll 46 defining the feed path 47 along which material is fed onto bed plate 48 mounted beneath the splitter and groover mechanism 50.

The air bag 57 and pivotal nature of top in-feed drive roll 44 effects a positive driving contact to propel the stock material 18 towards mechanism 50 while exerting a clamping effect in cooperation with bottom roll 46 to maintain the stock in smooth sliding contact with the bed plate 48 during the cutting-grooving operation. The bottom roll 46 is mounted on a cross shaft 46a with a sprocket 46b keyed to the shaft rotatably journalled in machine side frame members (not shown). Bottom roll 46 is chain-driven through sprocket 46b by a sprocket 60 also keyed to cross shaft 54. A guide fence 48a, extending longitudinally along one side of bed plate 48 in parallel relation to the planes of the cutting blades in mechanism 50, smoothly contacts a side of the stock material 18 to maintain proper alignment with the cutting blades.

A pair of top and bottom out-feed drive rolls 62,64 are mounted for chain-driven movement within machine 20 in a manner identical to that of the in-feed rolls 44,46 described supra. The out-feed drive rolls 62,64 cooperate with in-feed rolls 44 and 46 to maintain the now cut and grooved chords 12,14 in positive sliding contact with bed plate 48 during the splitting and grooving operation. Both in-feed and out-feed drive rolls 44,46 and 62,64 are commonly driven by a chain 66 and drive sprocket 68 connected to the output shaft 69 of a motor 70. The motor 70 may be mounted within machine 20 below the in-feed and out-feed drive roll mechanisms as shown in FIG. 5.

Referring to FIG. 6, the splitter and groover mechanism 50 in the present preferred embodiment includes a circular splitter blade 71 fixed to the horizontal axis of output shaft 72 of an arbor motor 74 supported by machine frame members (not shown) in stationary location. A pair of router blades 75 are also fixed to the output shaft 74 in parallel relation to opposite sides of the splitter blade 71 and spaced therefrom with a pair of spacers 77. A fastening member 78 secures the blades 71,75 and spacers 77 to the output shaft 72 to prevent movement thereof along the longitudinal axis of the output shaft extending transversely above feed path 47 of stock material 18.

Pre-cut lengths of stock material 18 of suitable width to form chords 12 and 14 (i.e., the stock material width is slightly greater than twice the chord width) are individually manually or automatically fed to in-feed drive rolls 44,46 where they are directed onto the horizontal plane of bed plate 48 into cutting contact with the splitter and router blades 71,75. The leading transverse end of stock material 18 enters into initial cutting contact with splitter blade 71 having a diameter greater than the diameter of router blades 75 to completely cut through the thickness of the stock material substantially along the central longitudinal axis thereof. As the stock material 18 continues to advance along the bed plate 48 under the driving action of in-feed rolls 44,46, the router blades 75 cut the grooves 32 and 34 into the upwardly exposed surfaces of chords 12 and 14 to the desired groove depth. Continued advancement of cut chords 12,14 along bed plate 48 causes the chord leading ends to be engaged by out-feed drive rolls 62,64 which assist the in-feed rolls 44,46 in maintaining the wooden material in proper contact with bed plate 48 while exerting a driving force to propel the material completely through the cutting and grooving mechanism 50. Thus, a pair of identical chords 12 and 14 are cut and grooved simultaneously as the entire length of the stock material is positively driven through cutting mechanism 50.

Upon completion of cutting, each chord 12 and 14 is swept by out-feed rolls 62,64 onto out-feed table 22 (FIG. 1 only) where the chords are ultimately transferred to flange feed location 24 via lateral conveyor ramp 26 and flange surge conveyor rack 28 discussed supra. At the flange feed location 24, chords 12,14 are either manually or automatically positioned on flange roll cases 141 along opposite sides of web in-feed location C with their grooves 32,34 respectively facing each other for subsequent joining to the web members 16.

The simultaneous splitting and grooving of wooden stock material 18 to provide identical chord members 12 and 14 off the assembly line 10' also tends to simplify the assembly line while taking optimal advantage of the existing production floor space. The simultaneous splitting and grooving of a single piece of wooden stock material 18 greatly simplifies the manufacturing and grooving of chord members 12 and 14 by overcoming the prior art disadvantages of first splitting a wooden member into separate chords and thereafter handling the separate chords to then provide grooves 32 and 34 within the separate chord members.

Although apparatus 20 is disclosed for cutting asymmetric grooves 32,34 in chords 12 and 14, it will be understood that grooves of other cross-sections (e.g., symmetric cross-sections or the hour glass cross-section disclosed in my co-pending application) may be formed by apparatus 20 by utilizing other router blades having appropriately shaped router bits. If necessary, additional overhead routing elexents may be disposed slightly downstream from mechanism 50 in alignment with grooves 32 and 34 to complete the routing of the grooves to the desired cross-section.

It will be further understood that splitter-groover apparatus 20 of the present invention may be used independently of the wooden I-beam assembly line of the present invention, and therefore with other assembly line arrangements. In addition, where desirable, apparatus 20 may be employed at an upstream location of assembly 10' to simultaneously cut and groove wooden stock material 18 into separate chords 12 and 14 fed directly onto in-feed roll cases 141, eliminating the need for out-feed table 22, lateral conveyor ramp 26 and surge rack 28.

Beveling the Webs

FIGS. 2–4 are illustrations of web members 16 undergoing a beveling operation which commences by positioning a stack 93 of webs 16 in a hopper with a transverse edge 16' of each web member in abutment with hold-back plate 94. The hopper includes a pair of spaced, bottom support rails 95 on which stack 93 is supported, and hold-back plate 94. The web members are individually fed from the bottom of the stack 93 through a bottom opening 96 of hold-back plate 94 by means of a pusher lug 98 projecting upwardly above and moving between support rails 95 to contact the rear transverse edge of a bottom-most web. The pusher lug 98 is motor driven by a chain 99 trained around sprockets 100 mounted on respective shafts 102 supported by machine frame mmmmrs (not shown). The individual web members 16 are propelled through bottom opening 96 by pusher lug 98 and maintained by a pair of side web guides 104 (only one shown) in lateral alignment with a web in-fmed drive system 105 having a top in-feed hold-down roll 106 and a bottom in-feed drive roll 108 each extending transversely along the web in-feed path.

Top and bottom in-feed rolls 106,108 of drive system 105 are part of a scarfer machine 90 in which beveled edges 17 of webs 16 are cut. These in-feed rolls 106,108 are mounted on rotatable shafts such as 109 journalled within machine frame members (not shown) of the scarfer 90. An air bag 110 connected to an overhead support 112 resiliently biases top in-feed hold-down roll 106 against the upwardly exposed surface of an in-feeding web member 16 to provide counterpressure enabling bottom drive roll 108 to exert a positive thrusting contact propelling the web member towards the motor driven scarfer or bevel forming heads 139. Similarly mounted top and bottom out-feed rolls 116 and 118 discharge the beveled webs onto a catcher rack 120 following the beveling operation. The bottom in-feed and out-feed drive rolls 108,118 are driven by means of sprockets 114 keyed to their respective shafts 109 and chains 122 connected to a chain drive mechanism 124. The chain drive mechanism 124 is driven by a sprocket 125 fixed to the output shaft of a motor 126 mounted to machine frame members (not shown) beneath the drive rolls.

A conventional hold-down bar assembly 130 as illustrated in FIG. 4 and omitted from FIGS. 2 and 3 includes a pair of laterally spaced hold-down bars 131 (only one shown) positioned to provide clamping contact against the top surface of an in-feeding web in cooperation with bed plate 132 to maintain the individual web members 16 in precise registration with the scarfer heads 139. The hold-down bars 131 mave inclined foward ends 131a allowing the hold-down bars to contact and be deflected upwardly against spring bias by the leading edge 16' of the web 16. The hold-down bars 131 ride along the top surface of the web member 16 during the beveling operation to press the web member against scarfer bed plate 132 as the web is driven past the scarfer heads 139 initially by means of the in-feed and thereafter the out-feed drive rolls. The hold-down bars 131 are normally biased towards bed plate 132 by spring 133 whose spring force is transxitted to the hold-down bars through linkages 135.

As illustrated in FIG. 3, the individual web members 16, while driven by in-feed drive rolls 106,108 and thereafter out-feed drive rolls 116,118, are moved past the motor driven bevel forming heads 139 creating the longitudinal tapers 17 along the upper edges of the web. The beveled webs are then discharged onto catcher rack 120 by out-feed drive rolls 116,118 where the webs are collected and ultimately grouped in stacks of predetermined height, i.e., about 1½ to 2 feet.

After the beveling operation, the beveled webs 16 are transferred in stacks (e.g., by forklift) from beveling area B to a web holding and gluing area D adjacent web in-feed location C.

Delivering the Web to a Web In-Feed Location

Referring to FIGS. 8 and 9, web holding and gluing area D comprises a lateral roller conveyor 140 mounted on vertical support 143 and including plural sets of idler rollers 142 having rolling movement in the direction of web in-feed hopper 145. Conveyor 140 defines a horizontal web feed path extending generally orthogonal to assembly line 10'. The web in-feed hopper 145 is located in the chords and webs assembly line 10' and positioned at the discharge end 140a of conveyor 140 between left and right flange in-feed roll cases 141. As illustrated in FIG. 9, the discharge end 140a of conveyor 140 extends elevationally above the right flange in-feed roll case 141 to avoid interference with flange movement along the assembly line 10'.

A series of separate web stacks 92' are positioned side-by-side on conveyor 140 with their transverse leading ends 16' exposed to the downstream direction of assembly line 10'. Preferably, the leading ends 16' of the beveled webs 16 in each stack 92' are flush to form a plane (FIG. 7) extending perpendicular to assembly line 10' for positive alignment with the in-feed opening 146 to the web hopper 145.

The web in-feed hopper 145 is formed by front and rear end walls 147 and 148 vertically mounted to support frame members (not shown). The front and rear end walls 147,148 are spaced a sufficient distance apart from each other to allow a web stack 92' to be easily dropped into the hopper 145 with the longest dimension of the webs 16 extending between the end walls. A side body member 149 connects the end walls 147,148 together in opposing relation to the mouth 146 of the web hopper 145 facing lateral conveyor 140 to maintain the in-line web stack in positive alignment with a web transfer mechanism 152.

The bottom of front end wall 147 is formed with a transverse opening 150 through which individual web members 16 are successively conveyed onto the web conveyor from the bottom of the stack 92'. The rear end wall 148 also includes a bottom transverse opening 151 through which a web pusher plate 152 translates under the action of a hydraulic or air cylinder 154 to successively feed individual web members 16 into first web drive rollers 156 (FIG. 8).

Successive feeding of web stacks 92' into hopper 145 is easy. An operator manually pushes a next-in-line stack along lateral conveyor 140 under the rolling action of idler rollers 142 until the stack reaches the downwardly inclined conveyor discharge end 140a to fall by gravity into the web hopper.

If desired, an automated web transfer mechanism may be utilized to move the web stacks 92' along conveyor 140 for successive transfer into web hopper 145.

Gluing the Butt Joints of the Webs and Web In-feed to the Assembly Line

Since the individual web members 16 successively discharged from web hopper 145 eventually abut one another under the action of second web drive rolls 160 positioned downstream from first web drive rolls 156 for drivng the web members along the web conveyor to form a continuous web, it is desirable to apply glue to one of the transverse edges of each web member 16 extending between beveled edges 17. Therefore, it is desirable to apply a coating of glue 16" to the leading transverse edges 16' of several next-in-line web stacks 92' while the stacks are awaiting transfer to web hopper 145. The glue coating may be manually applied to the leading transverse edges 16' by brush or with automated equipment.

Since the leading transverse edges 16' of web members 16 tend to be porous, a single glue layer is often absorbed by the web, resulting in an inferior bond between adjacent web pieces forming the continuous web material. Therefore, in accordance with the present invention, it is advantageous to apply a second glue coating to the leading transverse edges.16' of web members 16. Preferably, the second coating is applied one to three minutes after application of the first coating and before the first coating has completely dried. It is advantageous to apply the second glue coating to only one of stacks 92' as the stack is moved into the next-in-line position 92" (FIG. 9) prior to feeding into web hopper 145.

The feature of applying two coats of glue to the transverse leading edges 16' of web members 16 advantageously forms excellent bonds between the butt joints of the web members 16 when driven in end-to-end relationship forming the continuous web. Application of the glue coatings to the web leading edges is preferred, as opposed to the trailing edges, since the trailing edges in the preferred embodiments are acted upon by the pusher plate 152.

FIG. 12 is an illustration of an optional automatic glue applicator 165 for applying glue to the leading transverse web edges 16' as the webs 16 are sequentially ejected from web hopper 145 by pusher plate 152 towards first web drive 156. Applicator 165 includes a trough 166 adapted to be filled with glue 164 and positioned beneath the web conveyor line along which the web members 16 move tomards web drive 156. A glue applicator plate 167 as described below is pivotally mounted to an overhead support 169 by means of a shaft 170 extending transversely above the web conveyor.

Applicator plate 167 is downwardly inclined from overhead pivotal support shaft 170 in the downstream direction of the web conveyor.

The applicator plate 167 is of sufficient length such that the free end 167' thereof is dipped into glue 164 in its normally lower position. This lower position can be maintained by a weighted overhead arm 171 extending above the webs 16, having one end welded or otherwise fixed to shaft 170 or plate 167 and a forwardly projecting opposite end to which weights 168 are attached with nut and bolt arrangement 168a. The transverse width of applicator plate 167 is approximately the same as the width of each web member 16. Therefore, as each web memhmm is sequentially ejected from the hopper 145 into contact with the underside of plate 167, the plate 167 and weighted arm 171 jointly pivot about shaft 170 under the driving force of the web so that the glue coated end 167' effects a wiping contact with the web leading edge 16' resulting in application of glue. Excess glue drips back into the trough. The applicator plate 167 is essentially glue free as it rides over the top surface of the web member 16 to immediately drop back into the trough under the force of weighted arm 171 after clearing the web trailing edge for application of glue to succeeding webs in the same manner.

The location of automatic glue applicator 165 between hopper 145 and web drive 156 in assembly line 10' is optional. For example, applicator assembly 165 may be located downstream from web out-feed rolls 116,118 in scarfer machine 90 to apply a first glue layer to the leading end 16' of each beveled web member 16 in the event that scarfer 90 is placed in assembly line 10' downstream of web hopper 145. A second glue coating may then be applied if desired to the leading transverse edges 16' by means of a second applicator assembly 165 spaced downstream from the first applicator by a series (nmt shown) of web drive systems 156 maintaining the webs in spaced relationship until the second glue coating is applied, whereafter the webs enter second web drive 160. If first and second applicator assemblies 165 are used, then.the gluing of the web leading transverse edges 16' becomes an essentially automated procedure.

Joining the Webs and Flanges to Form the Wooden I-Beam

As discussed above and illustrated in FIG. 8, web members 16 are sequentially fed from web in-feed hopper 145 by pusher plate 152 into contact with first web support drive system 156 including a bottom chain driven drive roll 175 and a top hold-down roll 177. The web support drive 156 is spaced upstream from a second web support drive 160 also including a chain driven bottom drive roll 175' and top hold-down roll 177', where the constant drive from the rear from the second web drive system 160 causes the successively conveyed web pieces 16 to abut one another, forming a continuous web material. The movement of the continuous web under the driving force of web drive system 160 may be assisted by a chain driven web feed conveyor schematically illustrated in FIG. 8 at 179 with web hold-down wheels 180 positioned overhead to maintain the continuous web in horizontal position. The construction of web drive system 156,160 and web conveyor 179 is conventional, although the web drive systems may be independently driven by separate motors 157 and 159 as diagrammatically depicted in FIG. 8.

As illustrated in FIG. 7, chords 12 and 14 are fed along opposite sides of the continuous web on in-feed roll cases 141 with their grooves 32 and 34 cut in the surfaces thereof facing one another and facing the upwardly exposed beveled edges 17 of the continuous web 16. The chord members 12 and 14 are fed from left to right in FIG. 7 and between converging chord guides 187 and 189 where they are pressed into contact with inner chord drive wheels 190 rotatable about vertical axes. As illustrated in FIG. 10 and described in detail below, the chord drive wheels 190 are assisted by chord rams 260 positioned outwardly adjacent the chord feed paths to provide initial counterpressure for the drive wheels allowing the leading ends of each pair of chords 12 and 14 to advance between idler pairs of squeeze rollers 194 and additional chord converging guides 196 which progressively force the chords 12 and 14 towards the web members 16 so that the beveled edges 17 of the web members 16 enter into their final disposition in the grooves 32 and 34. Further pairs of squeeze rollers 198 rotatable about vertical axes are positioned along opposite sides of chords 12 and 14 now joined to webs 16 for maintaining the united webs and chords in joined relationship as the I-beam advances through the chords and webs assembly line 10'. It will be appreciated that arrangements of squeeze roller sets and converging guides for effecting this general type of chord converging and pressing assembly operation is well known in the trade.

After the webs 16 and chords 12,14 are joined together in the manner described above to form the wooden I-beam, the beam is driven through assembly line 10' by means of a beam support drive 200 comprising an overhead hold-down roller 202 engaging the upwardly exposed chord edges and a lower beam drive roller 204 driven by a motor (not shown). The beam support drive 200, assisted by guide idler rollers 201, conveys the wooden I-beam through an R/F tunnel 38 where the glued web-to-chord joints are cured and thereafter onto the beam out-feed table illustrated in FIG. 14 where the beams are singulated with a flying maw as described below.

FIG. 15 is an illustration of a glue applicator system generally indicated at 211 in FIGS. 1 and 15. There are two like glue applicator systems 211, one for each web-to-flange joint; and such glue systems are located in the overall assembly system as indicated in FIG. 1. Each glue applicator system 211 has a glue supply means schematically shown at 212; a cotton glue supply means may be used for both glue applicator systems 210. Glue supply means 212 is of any suitable type obtainable from commercial sources which supply glue equipment to laminated lumber producers. Each glue applicator system 210 includes a first glue applicator tubing 212 having its lower end 216 disposed above the upwardly disposed surface of groove 32 of chord flange 12 and in groove 34 of flange 14. Each system 211 also inclu es a second glue applicator tubing 214 having its lower end 216 disposed above the beveled surface 17 of web 16. Tubing 212 and 214 is made of any suitable commercially available metal or plastic. Such tubing 212,214 has a bore 215 sized so that glue is applied by metering feed pumps from source 212 whereby glue is applied in a continuous glue line 216a on upwardly exposed surfaces of respective grooves 32 and 34 of chord flanges 12,14 and glue also is applied in a continuous glue line 217 on beveled surfaces 17 of web 16. Glue source 212 in conjunction with bores 215 of tubes 212,214 provides glue to said groove surfaces at a rate correlated to the rate of feed of chord flanges 12 and 14 and web member 16 being joined to form the I-beam whereby the glue is applied by metered feed puxps as a continuous glue line bead on each of the above-mentioned surfaces. This arrangement provides a much simplified and more controllable glue application means. It also enables visual inspection and/or light or other instrument sensing to assure glue is applied to each web and flange surface in continuous unbroken ribbons. Further, when the edges 17 of web 16 are assembled in grooves 32 and 34 of chord flanges 12 and 14 to form connecting joints of the I-beam as shown and described the glue ribbons are caused to spread around all interfacing surfaces of web edges 17 and all groove surfaces to form a good gluebonded joint which longitudinally extends with integrity along each side of the resultant I-beam.

While optimum advantages are achieved with this glue system it will be appreciated that the present invention is capable of use with other gluing systems, so long as a continuous feed of glue is applied to the upwardly exposed surfaces of grooves 32 and 34 in flanges 12 mnd 14 and beveled edges 17 of web members 16.

Controlling the Movement of the Chords Within the Assembly Line

FIGS. 10, 11A and 11B are detailed illustrations of the chord drive wheels 190 and a mechanism for advancing the leading ends of a pair of next-in-line or succeeding chords 12' and 14' into abutting contact with the trailing ends of the preceding chords 12 and 14 to define an essentially endless pair of chords directed into contact with beveled edges 17 of the continuous web to form the wooden I-beam.

To eliminate a gap tending to be formed between adjacent in-line chord members 12,12' and 14,14' in the wooden I-beam which results in wasted material and a necessary trimming step upon cutting the wooden I-beam to desired length so that the chord or flange ends are flush with the web ends extending therebetween, the present invention provides for a positioning mechanism 259 for locating the leading end of the next-in-line chord 12' and 14' outwardly adjacent the chord feed path and in opposing relation to chord drive wheels 190. Positioning mechanism 259 includes a pair of stop bars 192 provided outwardly adjacent each chord feed path and slightly downstream from chord drive wheels 190. As in-line chords 12 and 14 are fed through assembly line 10' via chord drive wheels 190, next-in-line chords 12' and 14' are manually or automatically directed along the flange in-feed roll cases 141 for travel along a next-in-line chord feed path formed outwardly adjacent between the chord feed paths and converging guides 187. These next-in-line chords 12' and 14' are to some extent dragged by the moving in-line chords until the leading ends of the next-in-line chords contact stop bars 192 as illustrated in FIG. 11A.

The next-in-line chords 12' and 14' are maintained with positioning mechanism 259 in the FIG. 11A position until the trailing ends of chords 12 and 14 clear their respective drive wheels 190 as illustrated in FIG. 11B. The downstream passage of the trailing ends of chords 12 and 14 are sensed by a sensor 262 sensing the passage of one of these trailing ends. The sensor 262 actuates a pair of chord rams 260 located upstream from stop bars 192 in opposing relation to chord drive wheels 190. The chord rams 260, positioned outwardly adjacent the next-in-line chords 12' and 14' are actuated to advance the leading ends; of the next-in-line chords 12' and 14' inwardly into driven contact with drive wheels 190.

Each chord ram 260 has a cylinder 264 provided with a pair of longitudinally spaced cam followers 266 rotatably mounted at opposite ends of upper and lower mounting bars 268 (only the top bar is shown) provided at the piston ends of the chord rams. The cam followers 266 rotate about vertical shafts 269 extending between the top and bottom mounting bars.

In the retracted position of chord rams 260, cam followers 266 are positioned against the outer surface of next-in-line chords 12' and 14' which outer surfaces are formed in opposing relation to the inwardly exposed chord grooved surfaces. Upon sensing the downstream passage of the trailing ends of in-line chords 12 and 14, rams 260 are extended to advance the leading end of next-in-line chords 12' and 14' into driving contact with their respective chord drive wheels 190. The cam followers 268 remain in the extended position to provide counterpressure for the chord drive wheels 190 enabling the leading ends to enter between the converging sets of idler rollers 194 located downstream from the drive wheels. Thereafter, the rams retract to the FIG. 10 position enabling a succeeding pair of chords 12' and 14' to abut against stop bars 192.

Chord drive wheels 190 are driven independently of the web drive systems 156,160 and the beam drive 200. In addition, chord drive wheels 190 are driven at a speed sufficient to ensure that the leading ends of the next-in-line chords 12' and 14' move more quickly than the preceding chords 12 and 14 being driven at a slower speed by the beam drive 200 to assure that the leading ends of the next-in-line chords abut against the trailing ends of the preceding chords before these trailing ends and grooves 32 and 34 therein enter into joining relationship with beveled edges 17 of a web member 16. This arrangement allows the preceding and successive chords 12,12' and 14,14' to be continuously formed with each other and with continuous web material 16 which minimizes the amount of wasted material that must be trimmed from one end of the wooden beam after cutting to desired length.

Cutting the Wooden I-Beam

To cut the I-beam into a desired length, a flying saw 42 is positioned between the discharge end of R/F glue curing tunnel 38 and out-feed table 40. As illustrated in FIGS. 14, 16 and 17, flying saw 42 is mounted within a movable carriage 284 supported by wheels 290 for longitudinal movement along a support frame 286 having parallel upstanding members 288 extending along opposite sides of the I-beam conveyor path. The members 288 are spaced apart a sufficient distance to permit a saw blade 290 of flying saw 42 to translate completely across the width of the I-beam in the cutting cycle. Support rails 292 are respectively horizontally mounted to extend above each member 288 to provide movable support for carriage 284 supported on the members with wheels 290.

In the preferred embodiments of the present invention, flying saw 42 is used to singulate the I-beam being formed on assembly line 10' into specified lengths equal to the length of identical chords 12,14. To commence the cutting cycle, a sensor, such as photocell 295 in FIG. 7, is positioned upstream from saw blade 42' by a distance equal to about the length of chords 12,14. The photocell 295 is positioned to direct a beam of light onto the upwardly exposed surface of an in-line chord 12 in FIG. 7 to detect the passage of the trailing end of the chord before it is abutted by the leading end of the next-in-line chord 12'. In the preferred embodiment, photocell 295 or other suitable means for detecting the presence of the chord trailing end, is mounted slightly upstream from chord drive wheels 190 and flying saw blade 42' is positioned downstream by a distance approximately equal to the chord length which may be about 48 feet.

It will be appreciated that under certain operating conditions the photocell 295 may also be used to actuate the chord rams 260, eliminating sensor 262, for moving the next-in-line chords 12' and 14' into driving contact with chord drive wheels 190 after the in-line chords clear the drive wheels. Under these circumstances, the extent to which photocell 295 or other suitable means may be longitudinally shifted along the chord feed path and with respect to the FIG. 7 or 10 position, while providing the aforesaid dual function, may be easily determined by one of ordinary skill in light of the present disclosure. Of course, however, the provision of a separate sensor 262 and a separate sensor such as photocell 295 allows the photocell to be positioned independently of the sensor (i.e., without regard to the chord drive speed) so long as the sensor is positioned upstream from the point at which the trailing ends of the chords are abutted by the leading ends of the next-in-line chords.

Upon sensing of the trailing end of chord 12 by photocell 295, a signal transmitted to flying saw 42 actuates a clamp 300 mounted on carriage 284 above an inlet opening 302 therein through which the wooden I-beam is conveyed from R/F glue curing tunnel 43. Clamp 300 is driven downwardly, by means of air bag 301 filled with pressurized air supplied from a solenoid controlled air line responsive to the signal from photocell 295, into clamping contact with the I-beam by clamping against upwardly exposed surfaces of chords 12 and 14. This allows movable carriage 284 containing flying saw 42 to be mechanically connected to the I-beam and pulled forward in the downstream direction with the I-beam. The flying saw 42 thus travels at the same production line speed as the I-beam, and is actuated to cut the I-beam with precision as the carriage disengages from a sensor 301b mounted on the stationary support base. Thereafter, when the flying saw blade 42' has finished cutting the I-beam to desired length, the clamp 300 disengages from the I-beam by a signal generated from a downstream sensor 301b on the stationary base which is contacted by the carriage. This second signal causes depressurization of air bag 301 so that clamp 300 is raised by springs 317. The carriage 284 then returns to its original position under the action of a solenoid controlled air cylinder (not shown) responsive to the second signal to await the next signal from photocell 295 to commence the beam cutting cycle once again.

At the time flying saw blade 42' cuts across the I-beam, substantially the entire length of the cut I-beam is disposed on out-feed table 40 as illustrated in FIG. 14. The trailing end of the cut I-beam is pushed entirely onto out-feed table 40 by the continuously advancing leading end of the next wooden I-beam driven by the beam drive 200 and yet to be cut. The out-feed table 40 comprises separate tables 310 longitudinally spaced from each other and movably mounted to a frame support base 314 by means of linkages 316 having upwardly extending vertical portions 318 above the support base defining an uppermost position of the out-feed tables receiving the cut beam. These out-feed tables are connected via their linkages 316 to a pair of pneumatic rams 320 and 322 which are actuated by a signal from flying saw 42' immediately following cutting of the I-beam with saw blade 42.

If desired, standard (equal to the length of chords 12,14) and non-standard I-beam lengths may be cut by positioning sensor 295 on the out-feed table 282 to sense the leading end of the beam to be cut. Sensor 295 would be positioned (not shown) from saw blade 42' by a distance equal to the length of the desired cut.

Upon receiving the signal, the pistons of the pneumatic rams retract causing the linkages to pivot about their respective pivot points 322 on the support base so that each of the out-feed tables carrying part of the cut wooden I-beam descends. As the out-feed tables descend, the cut wooden I-beam engages a series of lateral conveyors 43 extending transversely with respect to the out-feed tables and along opposite transverse ends of the out-feed tables. These lateral conveyors provide sole support for the cut wooden I-beam as the out-feed tables descend below the upper run of the lateral conveyors at which time the cut I-beam is conveyed off the tables to an inspection, cut up and shipping location (not shown).

As the out-feed tables descend in the manner described above to intersect the lateral conveyors 43 it will be appreciated that the continuous throughput of the next wooden I-beam yet to be cut is being fed from assembly line 10' and through an out-feed opening 284' in carriage 284 since the assembly line is operating without interruption. The leading portion of the wooden I-beam emerging from the out-feed opening and yet to be cut passes elevationally above the cut I-beam on the descending tables. The cut I-beam is unloaded from the tables onto conveyors 43 and the tables are then elevated by the extending pistons of the pneumatic rams to support the next I-beam section before cutting occurs.

In view of the foregoing description of the preferred embodiment, it will be realized that numerous advantages are achieved with the present invention. For example, the simultaneous splitting and grooving of wooden stock material 18 to provide identical grooved chord members 12 and 14 off the assembly line 10' also tends to simplify the assembly line while taking optimal advantage of the existing production floor space. The simultaneous splitting and grooving of a single piece of wooden stock material 18 greatly simplifies the manufacturing and grooving of chord members 12 and 14 by overcoming the prior art disadvantages of first splitting a wooden member into separate chords and thereafter handling the separate chords to then provide grooves 32 and 34 within the separate chord members. Of course, if desired, material 18 may be cut and grooved simultaneously by positioning the splitter-groover machine in the webs and chords assembly line 10'.

Application of two layers of butt glue to the leading transverse edges of web members 16 is an important feature of the invention since the first layer of glue is often absorbed by the porous transverse leading edges resulting in an inferior bond between adjacent web members of the continuous web. Application of the second glue layer to the wet first glue layer promotes excellent bonding between the end-to-end web members of the continuous web resulting in a wooden I-beam of improved strength.

Scarfing of the individual web members 16 off the production assembly line 10' serves to simplify the assembly line while taking optimal advantage of the existing production floor space since the scarfer machine may be located wherever convenient. Scarfing off-line followed by application of butt glue to the leading transverse edges of web members 16 preferably in stacked relationship also avoids the prior art disadvantage of applying butt glue before the webs were scarfed which glue tended to enter between the bottom of the web member and underlying supporting surfaces causing upward elevational displacement of the web and subsequent misalignment with the scarfer blades.

The feature of operating the chord drive wheels 190 in the manner described above to provide end-to-end contact between adjacent chords of the wooden I-beam minimizes wasted material since there are slight if any gaps formed between the adjacent chords of the formed I-beam which must be trimmed by cutting the web material. The manner in which the next-in-line chords 12' and 14' are positioned with their leading ends in opposing relation to the chord drive wheels 190 while positioned outside the chord feed path is also unique since it assures the continuity of the arrival of follow-on chords 12' and 14' into abutment with the preceding chords 12 and 14.

The manner in which the wooden I-beam is cut by sensing the trailing edge of the respective chord lengths being joined to the continuous web material and thereafter mechanically connecting the flying saw 42 to move with the beam and thereby cut the beam with precision is accomplished in a novel manner without requiring a gap to be formed between preceding and succeeding chords which must later be trimmed to remove wasted material.

Operating the main beam drive 200 and chord drive wheels 190 with separate motive sources, such as variable speed hydraulic motors, and operating the second web drive 160 with a separate motive source, such as a variable speed hydraulic motor, allows the rate of production throughput to be varied. The first web drive 156 and the web chain conveyor 179 may be driven with electric motors.

It will be recognized that while the various foregoing advantages are optimal either individually or in combination, the benefits of the invention may still be realized by departing from one or more of such features within the scope of the dependent claims.

The present invention may be embodied in other specific forms without departing from the spirit or essential characteristics thereof. The present embodiments are presented merely as illustrative and not restrictive, with the scope of the invention being indicated by the attached claims rather than the foregoing description. All advantages which come within the meaning and range of equivalency of the claims are therefore intended to be embraced therein.

What is claimed is:

1. A production line method of making a unitary wooden I-beam from a pair of elongated wooden cord members and planar wooden web members, comprising the steps of:
   (a) forming said chord members by cutting a rectangular elongated piece of lumber substantially along its longitudinal axis into said chords and substantially simultaneously cutting longitudinal grooves into said chords;
   (b) shaping opposite edges of said web members to provide beveled edges;
   (c) grouping and conveying said web members;
   (d) driving a pair of chords respectively along opposite sides of the web members to define a chords and web line with the longitudinal grooves of said chords facing said web members and providing glue in said longitudinal grooves and on said beveled edges;
   (e) directing said pair of chords towards said web members so that opposite edges of said web members are respectively inserted into the longitudinal grooves of said pair of chords in the chords and web line to form an interconnecting glued joint therebetween and thereby said wooden I-beam;
   (f) driving said wooden I-beam at a predetermined continuous speed; and
   (g) cutting said continuous wooden I-beam into a desired length.

2. The method of claim 1 wherein said beveled edges of each web member are formed simultaneously by directing said web member into contact with a pair of cutting members and wherein said beveled edges are formed off the chords and web line.

3. The method of claim 2, wherein said web members are grouped in separate stacks positioned at an upstream location adjacent the chords and webs line, and comprising the further step of positioning one of said stacks within said line and sequentially feeding individual web members from the bottom of said stack into the line where they are conveyed as in step (c).

4. The method of claim 3, wherein said web member are conveyed in end to end relationship with each other as a continuous web, and comprising the further step of applying a first application of glue to one end of each web member grouped in said separate stacks, prior to supplying one of said stacks to the production line.

5. The method of claim 4, comprising the step of applying a second application of glue to said one end of each web member positioned in one stack next-in-line for transfer to the production line.

6. The method of claim 4, comprising the step of applying a second application of glue to said one end of said web member after said member is fed from the stack into the production line.

7. The method of claim 1, wherein, prior to inserting web member beveled edges into said chord grooves, glue of step (d) is applied to upwardly disposed beveled edges and to upwardly disposed surfaces of said chord grooves.

8. The method of claim 1 wherein the step of cutting said continuous wooden I-beam into desired length occurs when one of the trailing ends of said chord members is sensed with sensing means.

9. The method of claim 7, wherein each chord member is of predetermined standard length.

10. The method of claim 8, wherein said continuous wooden I-beam is cut with a flying saw positioned at a first location a predetermined distance from said sensing means.

11. The method of claim 10, comprising the further steps of clamping said flying saw at said first location to the wooden I-beam immediately upon sensing of the trailing end, moving the flying saw with the I-beam at said predetermined continuous speed, translating a saw blade of the flying saw to cut the wooden I-beam to desired length, and unclamping and returning the flying saw to said first location.

12. The method of claim 1 or 2, wherein said simultaneous cutting and grooving of the chords occurs off the chords and webs line.

13. The method of claim 12, wherein a pair of said chords are directed laterally from the cutting and grooving location for placement along opposite sides of said web members.

14. The method of claim 1 or 8, comprising the further steps of:
   (a) sensing passage of a trailing end of at least one of said pair of chord members prior to said trailing ends being joined directly to said continuous web;
   (b) directing a next-in-line pair of chords with said chord drive members towards the trailing ends of said preceding pair of chords at a chord drive speed greater than said predetermined continuous speed so that the leading ends of said next-in-line chords abut directly against the trailing ends of said preceding chords; and (c) repeating step (a) with said next-in-line chords in abutting contact with said preceding chords to form a continuous wooden I-beam.

15. The method of claim 14, wherein said continuous web and chords are independently driven prior to being directed into contact with each other.

16. The method of claim 14, comprising the further step of positioning leading ends of said next-in-line pair of chords out of the feed path of said preceding chords and in opposing relation to the chord drive members, and directing said next-in-line chords into driven contact with said chord drive members immediately after the trailing ends of the preceding chords clear said chord drive members.

17. The method of claim 15, wherein said wooden I-beam is driven independently of said continuous web and said chords.

18. The method of claim 16, wherein the leading ends of said next-in-line chords are maintained in stationary position opposite the chord drive members prior to being directed into driven contact therewith.

19. The method of claim 18, wherein the leading ends of said next-in-line chords are positioned outwardly adjacent the travel path of the preceding chords prior to being directed into driven contact with the chord driving members.

20. A method of making a unitary wooden I-beam from a pair of elongated wooden chord members and planar wooden web members, comprising the steps of:

(a) forming said chord members by cutting a rectangular elongated piece of lumber substantially along its longitudinal axis into said chords and substantially simultaneously cutting said longitudinal grooves into said chords;

(b) beveling opposite longitudinal edges of each web member simultaneously by directing said web member into contact with a pair of cutting members;

(c) grouping and conveying said web members in at least two separate stacks adjacent a chords and webs assembly line;

(d) applying a first layer of glue to leading transverse edges of each web member within each stack extending between the beveled longitudinal edges;

(e) applying a second layer of glue to one of said stacks directly adjacent the chords and webs assembly line;

(f) feeding said stack of web members adjacent the chords and webs assembly line into the line and grouping and conveying said web members in an end-to-end abutting relationship as a continuous web within the line;

(g) driving a pair of chords respectively along opposite sides of the web members with the longitudinal grooves of said chords facing said web members;

(h) providing glue in said longitudinal grooves and on said beveled edges;

(i) directing said pair of chords towards said web members so that opposite edges of said continuous web are respectively inserted into the longitudinal grooves of said pair of chords to form an interconnecting glue joint therebetween and thereby said wooden I-beam;

(j) driving said wooden I-beam at a predetermined continuous speed with a first drive source while driving said pair of chords with a second drive source so that the chords tend to travel faster than the wooden I-beam so that adjacent in-line chords abut one another; and (k) cutting said wooden I-beam to desired length.

21. The method of claim 20, comprising the further step of sensing the trailing end of one of said chords before it is contacted by the leading end of a preceding in-line chord in abutting engagement and actuating cutting means by sensing said trailing edge to cut the wooden I-beam to desired length.

22. A production line assembly for manufacturing a unitary wooden I-beam from a pair of longitudinally grooved elongated wooden chord members and planar wooden web members, comprising:

(a) means for cutting opposite longitudinal edges of said web members conveyed to said cutting means for forming longitudinal beveled edges;

(b) means positioned downstream from said cutting means for applying an adhesive coating to one transverse end of said web members extending between said beveled edges;

(c) means for conveying said beveled and glued web members in end-to-end relationship to each other as a continuous web;

(d) means for driving a pair of chords respectively along opposite sides of the continuous web with the longitudinal grooves of said chords facing said continuous web; and (e) means for directing said pair of chords towards said continuous web so that said beveled edges are respectively inserted into the grooves of said chords to form a joint therebetween.

23. A production line assembly for manufacturing a unitary wooden I-beam from a pair of lingitudinally grooved elongated wooden chord members and planar wooden web members provided with opposite longitudinally beveled edges, comprising:

(a) means for grouping and conveying said web members in end-to-end relationship as a continuous web;

(b) means for driving a pair of chords respectively along opposite sides of the continuous web with chord drive members with longitudinal grooves of said chords facing said continuous web;

(c) means for directing said pair of chords towards said continuous web so that opposite sides of said continuous web are respectively inserted into the longitudinal grooves of said chords to form an interconnecting joint therebetween and thereby said wooden I-beam;

(d) means for driving said wooden I-beam at a predetermined continuous speed;

(e) means for sensing passage of at least one of a leading end of said continuous beam, said sensing means being located at a predetermined position along the production line; and means for cutting said I-beam to desired length, said cutting means being actuated by said sensing means and including a flying saw having means for clamping said saw to the wooden I-beam for movement of said saw at said continuous speed, and a saw blade translating through the wooden I-beam to affect cutting thereof during clamping contact of said saw with said beam, wherein said sensing means is a sensor positioned downstream from the cutting means to detect passage of the leading end of the beam past a known point.

24. A method of making a unitary wooden I-beam from a pair of grooved elongated wooden chord members and a planar wooden web member, comprising the steps of:
(a) cutting opposite longitudinal edges of said web members to form beveled edges;
(b) applying an adhesive coating to one transverse end of said web member extending between said beveled edges;
(c) conveying said beveled and glued web members in end-to-end relationship as a continuous web;
(d) driving a pair of chords respectively along opposite sides of the continuous web with the longitudinal grooves of said chords facing said continuous web; and
(e) directing said pair of chords towards said continuous web so that said beveled edges are respectively inserted into the grooves of said chords to form a joint therebetween.

25. The method of claim 24, wherein steps (c)–(e) occur along a chords and webs assembly line and said beveled edges are cut into said web members off the line for grouping in discrete stacks transferred to the production line.

26. The method of claim 25, wherein said adhesive is applied to a plurality of said one transverse end of each web member lying in a common plane in stacked relationship.

27. The method of claim 26, wherein said adhesive is applied to a predetermined group of said stacks.

28. The method of claim 27, wherein a second layer of adhesive is applied to said one transverse end in a next-in-line stack immediately prior to transfer to the assembly line for conveying as in step (c).

29. The method of claim 27, wherein a second layer of adhesive is applied to a pre-glued leading end of said web member after it is fed onto the production line from an in-line stack.

30. A method of making a unitary wooden I-beam from a pair of grooved elongated wooden chord members and planar wooden web members, comprising the steps of:
(a) cutting an elongated, rectangular wooden stock member along a plane passing substantially through the center of the stock member to form substantially identical chords, and simultaneously cutting in one surface of each of the chords substantially parallel to the longitudinal axis thereof a longitudinal groove of predetermined cross-section;
(b) delivering said pair of grooved chords to a chord in-feed location of a wooden I-beam assembly production line;
(c) cutting opposite longitudinal edges of said web members to form beveled edges;
(d) grouping the beveled web members into stacks of predetermined height;
(e) transferring said stacks to a position approximate a web in-feed means in said production line;
(f) delivering one of said stacks to the web in-feed location and sequentially feeding individual stacked webs into the production line for conveyance in end-to-end relationship as a continuous web between the chord members; and
(g) directing said pair of chords towards said continuous web so that opposite edges of said continuous web are respectively inserted into the longitudinal grooves of said pair of chords to form an interconnecting joint therebetween and thereby said wooden I-beam.

31. The method of claim 30, wherein an adhesive coating is applied to one transverse end extending between said beveled edges of each web member disposed within each group of stacks.

32. The method of claim 31, wherein a second layer of adhesive is applied to said transverse ends in a next-in-line stack to be fed to the web in-feed location.

33. The method of claim 32, wherein a second layer of adhesive is applied to a pre-glued leading end of said web member after it is fed onto the production line from an in-line stack.

34. A method of making a wooden I-beam from a pair of elongated wooden chord members and a planar wooden web member, comprising the steps of:
(a) grouping and conveying said web members in end-to-end relationship as a continuous web;
(b) driving a pair of chords respectively along opposite sides of the continuous web with the longitudinal grooves of said chords facing said continuous web;
(c) directing said pair of chords towards said continuous web so that opposite edges of said continuous web are respectively inserted into the longitudinal grooves of said pair of chords to form an interconnecting joint therebetween and thereby said wooden I-beam;
(d) driving said wooden I-beam at a predetermined continuous speed;
(e) sensing passage of an end of one of the said chord members past a predetermined location along the production line; and
(f) initiating cutting of said wooden I-beam upon sensing passage of said end to form a wooden I-beam of desired length,
wherein passage of a trailing end of one of said chord members is sensed upstream from the cutting location.

35. A method of making a wooden I-beam from a pair of elongated wooden chord members and a planar wooden web member, comprising the steps of:
(a) grouping and conveying said web members in end-to-end relationship as a continuous web;
(b) driving a pair of chords respectively along opposite sides of the continuous web with the longitudinal grooves of said chords facing said continuous web;
(c) directing said pair of chords towards said continuous web so that opposite edges of said continuous web are respectively inserted into the longitudinal grooves of said pair of chords to form an interconnecting joint therebetween and thereby said wooden I-beam;
(d) driving said wooden I-beam at a predetermined continuous speed;
(e) sensing passage of an end of one of the said chord members past a predetermined location along the production line; and
(f) initiating cutting of said wooden I-beam upon sensing passage of said end to form a wooden I-beam of desired length,
wherein passage of a leading end of said wooden I-beam is sensed downstream from the cutting location.

36. The method of claim 34 or 35, wherein cutting of said wooden I-beam occurs with a flying saw.

37. The method of claim 36, comprising the further step of clamping said flying saw to the wooden I-beam upon sensing as employed in step (e), and moving the flying saw with the clamped I-beam at said predetermined continuous speed, translating a saw blade of the flying saw to cut the wooden I-beam and unclamping and returning the saw to its start position.

38. A production line assembly for manufacturing a unitary wooden I-beam from a pair of longitudinally grooved elongated wooden chord members and planar wooden web members provided with opposite longitudinally beveled edges, comprising:
(a) means for grouping and conveying said web members in end-to-end relationship as a continuous web;
(b) means for driving a pair of chords respectively along opposite sides of the continuous web with chord drive members with longitudinal grooves of said chords facing said continuous web;
(c) means for directing said pair of chords towards said continuous web so that opposite sides of said continuous web are respectively inserted into the longitudinal grooves of said chords to form an interconnecting joint therebetween and thereby said wooden I-beam;
(d) means for driving said wooden I-beam at a predetermined continuous speed;
(e) means for sensing passage of a trailing end of one of said chord members forming the continuous beam, said sensing means being located at a predetermined position along the production line; and means for cutting said I-beam to desired length, said cutting means being actuated by said sensing means and including a flying saw having means for clamping said saw to the wooden I-beam for movement of said saw at said continuous speed, and a saw blade translating through the wooden I-beam to affect cutting thereof during clamping contact of said saw with said beam,
wherein said sensing means is a sensor positioned to detect passage of a trailing end of one of said chord members at a known upstream location from the cutting means.

39. The production line assembly of claim 38, further comprising means for unclamping the flying saw from the wooden I-beam after cutting and returning said flying saw in an upstream direction to a start position.

40. A production line assembly for manufacturing a unitary wooden I-beam from a pair of longitudinally grooved elongated wooden chord members and planar wooden web members provided with opposite longitudinally beveled edges, comprising:
(a) means for conveying said web members in end-to-end relationship as a continuous web;
(b) means for conveying a pair of chords respectively along opposite sides of the continuous web with the longitudinal grooves facing said web, said chord conveying means including chord drive members;
(c) means for directing said pair of chords towards said continuous web so that opposite edges of said continuous web are respectively inserted into the longitudinal grooves of said pair of chords to form an interconnecting joint therebetween and thereby said wooden I-beam;
(d) means for driving said wooden I-beam at a predetermined continuous speed;
(e) means located for sensing passage of a trailing end of at least one of said pair of chord members prior to said trailing ends being joined directly to said continuous web;
(f) means for directing a next-in-line pair of chords into driven contact with said chord drive members for conveyance towards the trailing ends of said preceding pair of chords, said chord drive members being driven to move said chords at a travel speed greater than the predetermined continuous speed of the wooden I-beam so that the leading ends of said next-in-line chords abut directly against the trailing ends of said preceding chords;
(g) positioning means mounted in opposing relation to each chord drive roller for maintaining the leading end of said next-in-line chord in a temporary stationary position prior to actuating said means for directing the next-in-line chords into driving contact with the chord drive members with said sensing means; and
(h) means for cutting said continuous wooden I-beam into a desired length.

41. The production line assembly of claim 40, wherein said chord drive members include a pair of driven rollers positioned along opposite sides of the continuous web feed path.

42. The production line assembly of claim 41, wherein said web conveyor means includes a web drive mechanism having a driven roller projecting into the feed path of the continuous web to effect driving contact with the continuous web, said I-beam driving means including an overhead driven roller extending transversely to contact upwardly exposed surfaces of said chords.

43. The production line assembly of claim 42, wherein said chord drive rollers, web drive rollers and beam drive rollers are independently driven with separate motive means.

44. The production line assembly of claim 40, wherein said positioning means includes a pair of stop bars extending generally orthogonal to the travel path of the driven chords and being mounted outside the travel path, said leading ends of the next-in-line chords adapted to abut against the stop bars.

45. The production line assembly of claim 44, wherein said sensing means is a limit switch positioned slightly upstream from the chord drive rollers.

46. The production line assembly of claim 45, wherein said means for directing next-in-line chords into contact with the chord drive rollers include retractable chord rams mounted outwardly adjacent the next-in-line chords in opposing relation to said chord drive rollers, said chord rams in an extended position pushing said next-in-line chords into driving contact with the chord drive rollers and thereafter being retractable to provide clearance enabling a succeeding chord to abut against the stop bars.

47. The production line assembly of claim 40, wherein said cutting means includes a flying saw located downstream from said sensing means for detecting the trailing end of one of the chords, the saw being mounted on a carriage for movement between first and second longitudinal positions, and clamping means on said carriage for movement into clamping contact with the I-beam upon actuation by said sensing means detecting passage of the trailing end, clamping of said flying saw at said first location enabling the carriage and saw to move with the I-beam at said predetermined continuous speed, enabling a saw blade of the flying saw to translate and cut the wooden beam to desired length as the carriage travels from first to second location, and means for unclamping the saw from the beam and returning the saw to said first location.

48. The production line assembly of claim 47, further including an out-feed table positioned downstream from the flying saw to receive the cut beam, and means for raising and lowering the out-feed table, said table in the raised position receiving the cut beam from the saw, movement of said table to the lower position enabling the cut beam to be directed onto lateral conveyor means for transferring the cut beam from the production line.

49. The production line assembly of claim 48, further comprising means positioned for applying a stream of glue to upwardly exposed beveled edges of said web members and an upwardly exposed surface of each chord groove before the webs and chords are joined together.

50. The production line assembly of claim 49, further comprising an R/F tunnel located between the I-beam forming means and said cutting means to cure said glue.

51. The production line assembly of claim 40 or 47, further comprising means for containing a stack of web members upstream from the web conveyor means, and means for sequentially feeding individual web members from the bottom of the stack into the web conveyor means.

52. The production line assembly of claim 51, further comprising lateral conveyor means for receiving a plurality of stacks of web members, said lateral conveyor means having a discharge end in alignment with the containing means.

53. The production line assembly of claim 52, wherein said containing means includes a hopper formed by side walls and open at one side thereof facing the lateral conveyor means, front and rear openings being respectively formed at the bottom of opposing side walls extending transversely with respect to the web conveyor means, the height of the front opening being slightly greater than the thickness of said web members, and further including pusher plate means movable through the rear opening for sequentially feeding bottom position web members to the web conveyor means.

54. The production line assembly of claim 53, further including means for applying glue to the leading end of each web member, said glue applying means being located downstream from the web hopper.

55. The production line assembly of claim 54, wherein said glue applying means includes a trough adapted to contain glue and an applicator plate pivotally mounted above the web conveyor path and having a lower end inclined downwardly into the trough, whereby movement of said web members along the web conveyor means causes the leading end of each web member to deflect the applicator plate upwardly out of the trough and effect a wiping contact therewith to coat the leading end with glue, passage of the trailing end of the web member allowing the applicator plate to pivot downwardly into the trough.

56. The production line assembly of claim 52, further including second lateral conveyor means located upstream from the web conveyor means for feeding grooved chords for movement along opposite sides of the web conveyor means.

57. The production line assembly of claim 40, further comprising means for cutting an elongated rectangular wooden stock member along a plane passing through the center of the stock member to form substantially identical chords, and means for cutting in one surface of each of the chords substantially parallel to the longitudinal axis thereof a longitudinal groove of predetermined cross-section, and means for feeding said grooved chords to an upstream end of said second lateral conveyor means.

* * * * *